United States Patent [19]
Fukuzaki et al.

[11] Patent Number: 5,629,500
[45] Date of Patent: May 13, 1997

[54] POSITION POINTING DEVICE, SYSTEM AND METHOD EMPLOYING AC FIELD

[75] Inventors: Yasuhiro Fukuzaki; Yuji Katsurahira, both of Saitama-ken, Japan

[73] Assignee: Wacom Co., Ltd., Saitama, Japan

[21] Appl. No.: 384,557

[22] Filed: Feb. 3, 1995

[30] Foreign Application Priority Data

Feb. 10, 1994 [JP] Japan ................................ 6-016800

[51] Int. Cl.[6] .................................................. G09G 3/02
[52] U.S. Cl. ................................ 178/19; 178/18; 178/20
[58] Field of Search .............................. 178/18, 19, 20; 345/150, 153, 155, 173, 179

[56] References Cited

U.S. PATENT DOCUMENTS

| | | | |
|---|---|---|---|
| Re. 33,805 | 1/1992 | Yamanami et al. | 178/18 |
| Re. 33,894 | 4/1992 | Bradley | 345/155 |
| Re. 34,835 | 1/1995 | Ozeki | 345/153 |
| 4,507,523 | 3/1985 | Gohara | 178/19 |
| 4,730,186 | 3/1988 | Koga | 345/129 |
| 4,878,178 | 10/1989 | Takakura | 345/199 |
| 5,023,408 | 6/1991 | Murakami et al. | 178/18 |
| 5,134,388 | 7/1992 | Murakami et al. | 178/19 |
| 5,333,243 | 7/1994 | Best | 345/153 |
| 5,349,139 | 9/1994 | Verrier et al. | 178/19 |
| 5,434,372 | 7/1995 | Lin | 178/19 |

FOREIGN PATENT DOCUMENTS 63-70326  3/1988  Japan.
2-162410  6/1990  Japan.

*Primary Examiner*—Wellington Chin
*Assistant Examiner*—Vijay Shankar
*Attorney, Agent, or Firm*—Lowe, Price, LeBlanc & Becker

[57] ABSTRACT

Detailed information about plural factors determining a color and the coordinate value of a pointed position are determined from a position pointing device. The detailed information about the plural colors is by factors such as detailed gradation information on basic colors such as red, green, and blue. The amplitude or frequency of an AC field is controlled in accordance with the set color information. The AC field has a spatial distribution corresponding to the coordinate value of the pointed position.

30 Claims, 19 Drawing Sheets

POSITION POINTING DEVICE, SYSTEM AND METHOD EMPLOYING AC FIELD

BACKGROUND OF THE INVENTION

RELATION TO CO-PENDING APPLICATION

This application is related to co-pending application Ser. No. 08/362,643, filed Dec. 23, 1994.

1. Field of the Invention

The present invention relates to an improvement in a position pointing device used in combination with a position detecting device employing electromagnetic waves.

2. Description of the Related Art

Prior to the instant application, the applicant has proposed, in Japanese Patent Application No. 61-213970 (Japanese Patent Laid-Open No. 63-70326), a position detecting device in which a sensing section exchanges electric wave signals with a position pointing device so as to detect the coordinate value of a position pointed by the position pointing device.

Briefly, the position detecting device disclosed in Japanese Patent Laid-Open No. 63-70326 has a plurality of loop coils constituting the sensing section and adapted to transmit an electric wave of a predetermined frequency. The electric wave is received by a resonance circuit provided in the position pointing device so that resonance takes place in the resonance circuit to emit electric wave. This electric wave is received by the loop coil so that a voltage is inducted in the loop coil. This operation is conducted successively on the plurality of loop coils constituting the sensing section, so that the coordinate value of the position pointed by the position pointing device is determined based on the levels of the voltages induced in the loop coils.

The position detecting device of the type described faces a demand for the ability to enter various kinds of information in addition to the coordinate value of a pointed position, such as information which indicates that the position pointing device, e.g., a pen or the like, has been set to a position for pointing a definite position (this state will be referred to as "pen-down state," hereinafter), information concerning the type of the position pointing device, e.g., a pen, a cursor or the like, as well as a demand for inputting, together with the coordinate values, information for continuously varying values of parameters other than the coordinate information, such as, for example, thickness or width of a line and hue or density (brightness) of the position or area appointed by the pointing device.

To cope with such demands, the position pointing device disclosed in Japanese Patent Laid-Open No. 63-70326 employs a manual switch which selectively connects, to the resonance circuit which is constituted by a coil and a capacitor, an additional capacitor so as to slightly vary the resonance frequency, the slight variation in the resonance frequency being detected as a variation in the phase angle so as to be used as information indicative of the aforesaid various types of information.

In Japanese Patent Application No. 63-316943 (Japanese Patent Laid-Open No. 2-162410), the applicant also proposed a position detecting device and an inputting pointing device therefor having a capacitance-variable capacitor (variable capacitor) which is turned as a knob provided on the top end of a penholder turns, causing the capacitance thereof to vary continuously, so that the resonance frequency also continuously varies in accordance with the turning angle of the variable capacitor, the continuous change in the resonance frequency being detected as a continuous change in the phase angle to be used as information for continuously varying the parameter.

In the device according to the aforesaid Japanese Patent Laid-Open No. 2-162410, however, the range, over which the resonance frequency varies as the capacitance of the capacitance-variable capacitor varies coincides with the range (about −60° to about +60°) over which such variations in the resonance frequency can be detected. For this reason, only rough information on a pointed position, the color of a specified area, etc. can be entered, such rough information being typically represented by the input of information on which one of a plurality of preset colors (e.g., red, green, blue, purple, sky blue, brown, white, gray, bright red, bright green, bright blue, bright purple, bright sky blue, yellow, bright white, and black). Thus, the device is not capable of enabling the input of detailed information concerning a plurality of factors which define a color, such detailed information including the one concerning a hue, brightness and chroma, and detailed gradation information, e.g., 256 gradations, of basic colors such as red, green, and blue.

To solve the problem described above, there is a method available, whereby a menu for setting such information on a display screen is displayed, so that an operator may select and set using the position pointing device. This method, however, does not enable the operator to define colors only through the position pointing device, presents a drawback of poor man-machine interface.

SUMMARY OF THE INVENTION

Accordingly, it is an object of the present invention to provide a position pointing device which permits the input of the coordinate value of a pointed position and color information, particularly, detailed information concerning a plurality of factors defining a color, with good interface between man and machine.

To this end, according to one aspect of the present invention, there is provided a position pointing device designed to enter the coordinate value of a pointed position and information on a color by exchanging an electromagnetic wave with a position detecting device, the position pointing device being equipped with an electromagnetic wave generating means which generates an electromagnetic wave having certain space distribution corresponding to the coordinate value of a pointed position and the intensity or frequency of which varies in accordance with external control, a color information setting means for setting detailed information on a plurality of factors defining a color, a control means for controlling the electromagnetic wave generating means in accordance with the set contents, and a power supplying means for supplying power to component units.

The above and other objects, features, and advantages of the present invention will become clear from the following description when the same is read in conjunction with the accompanying drawings.

3

Figure 4:
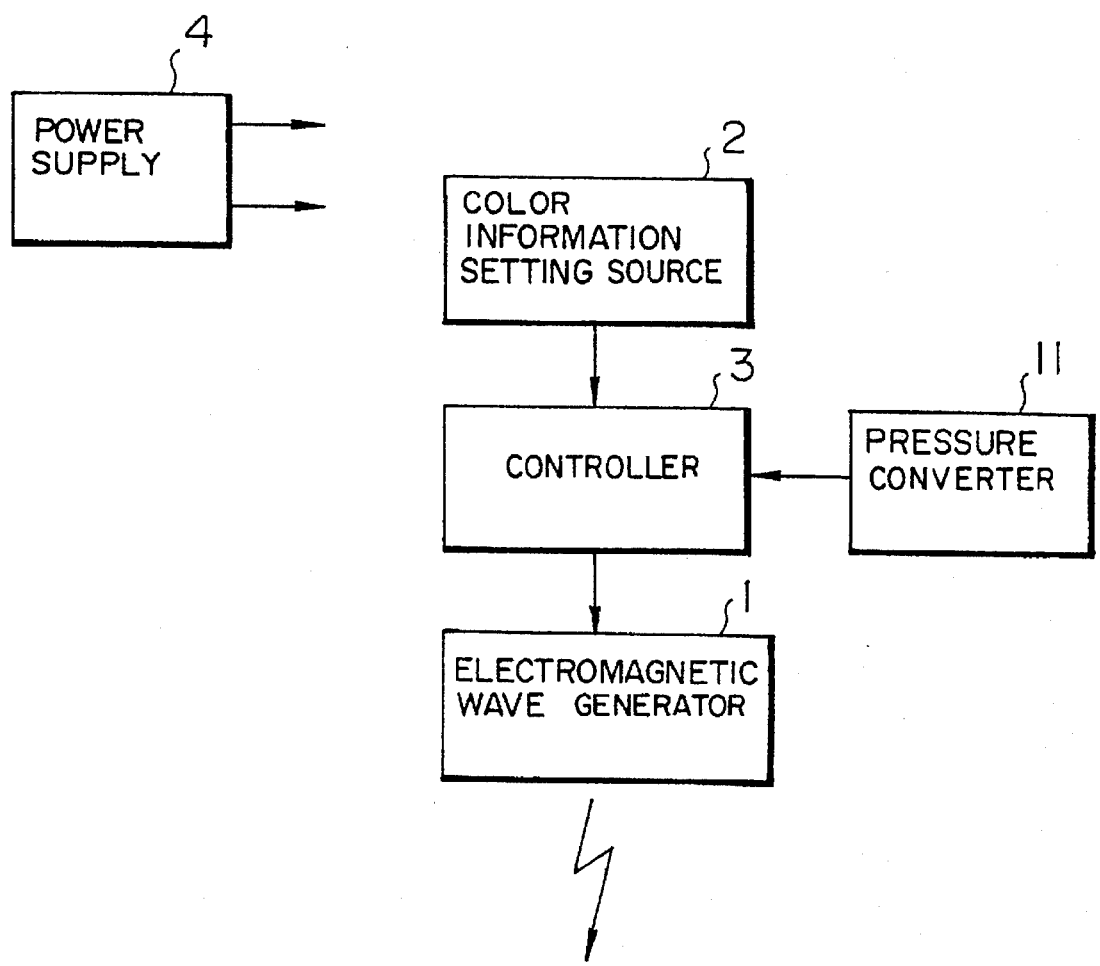
Figure 5:
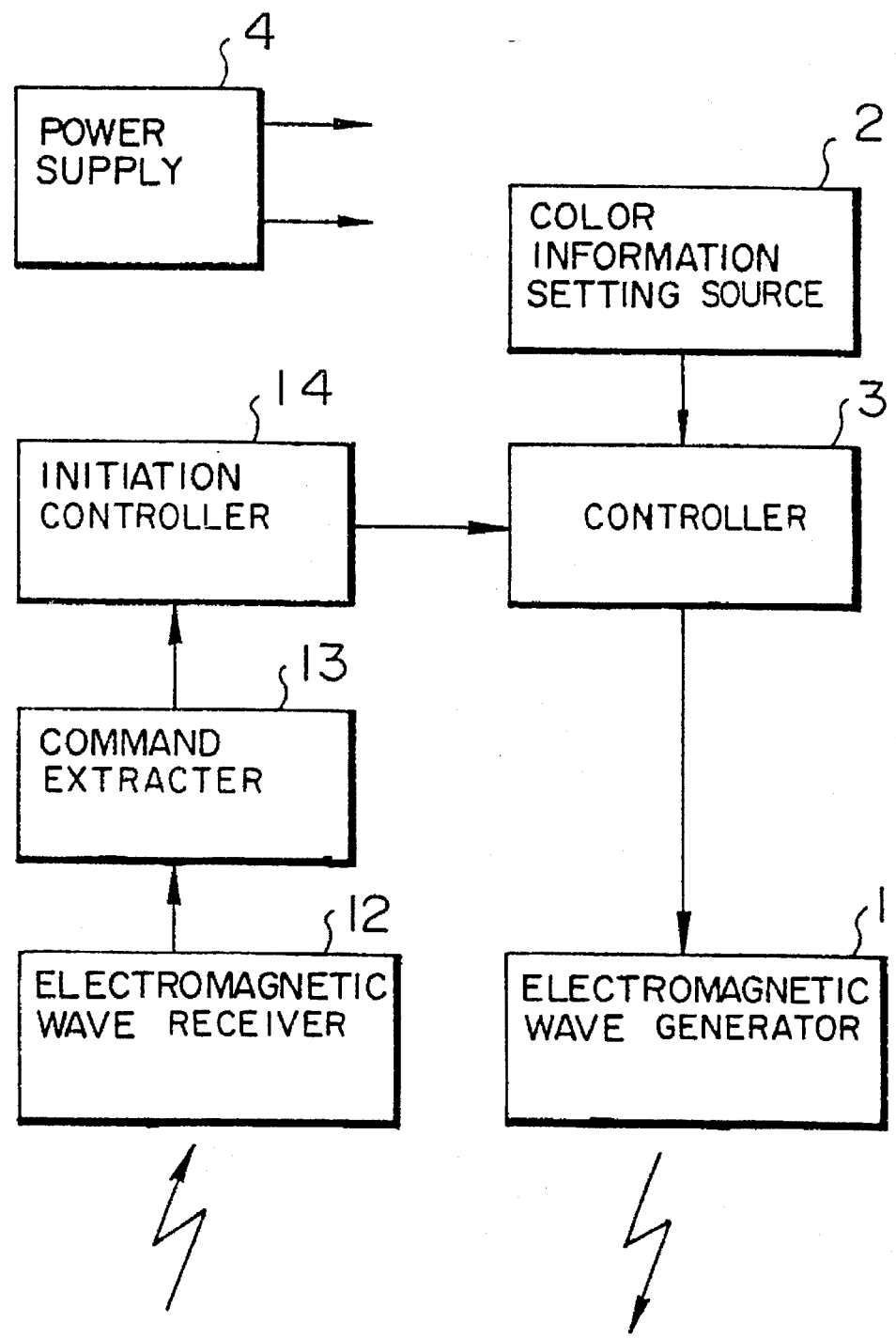
Figure 6:
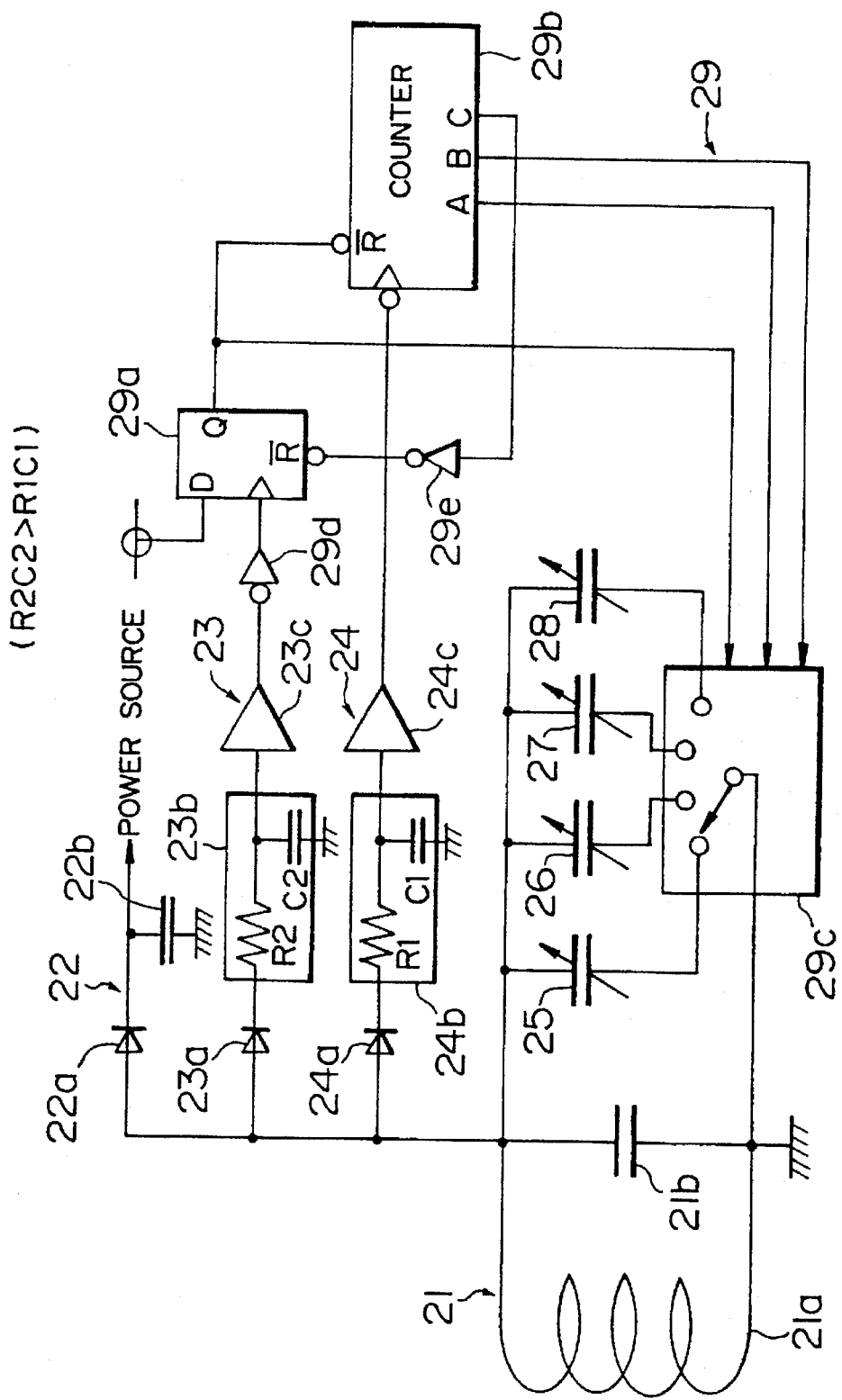
Figure 7:
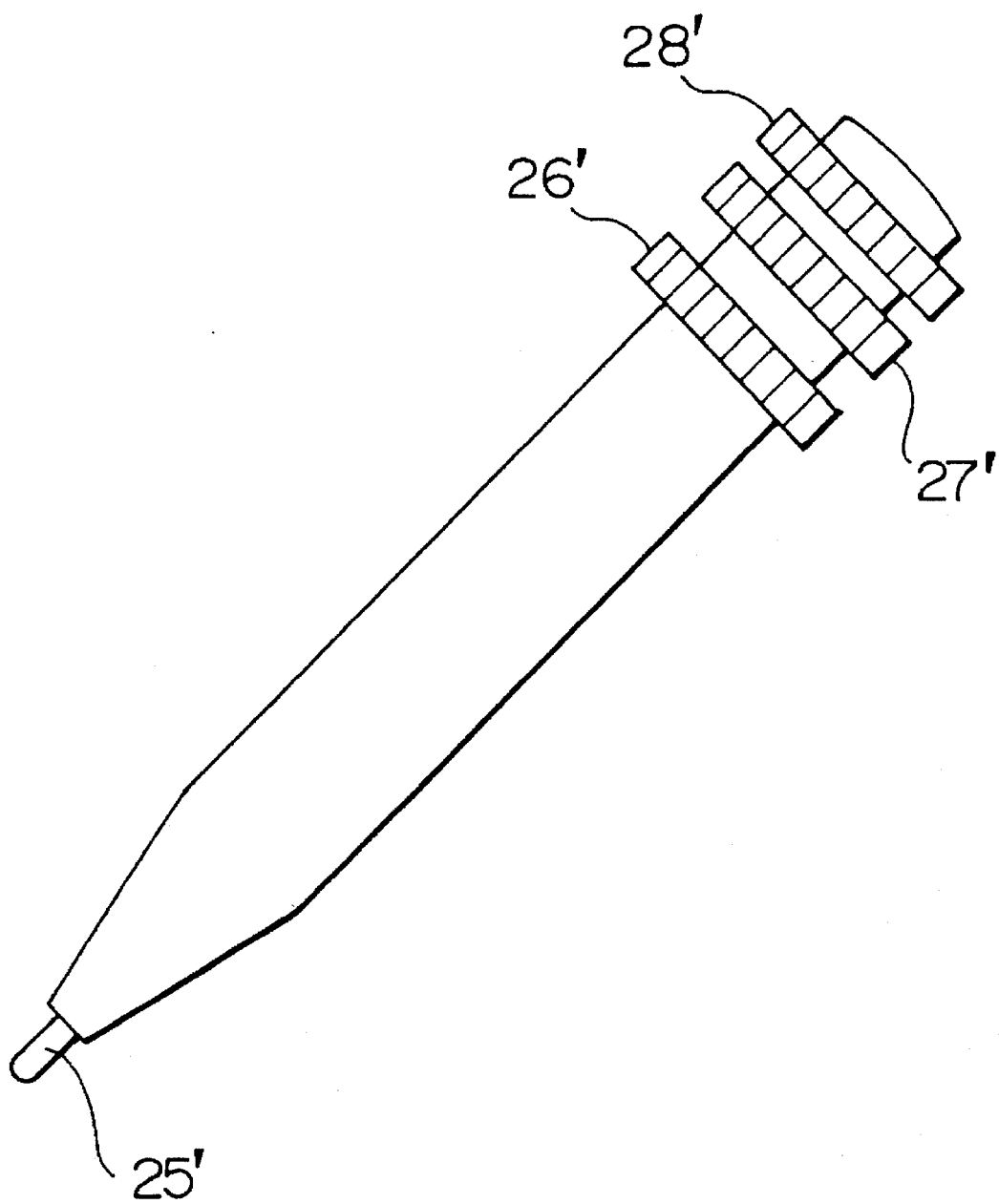
Figure 8:
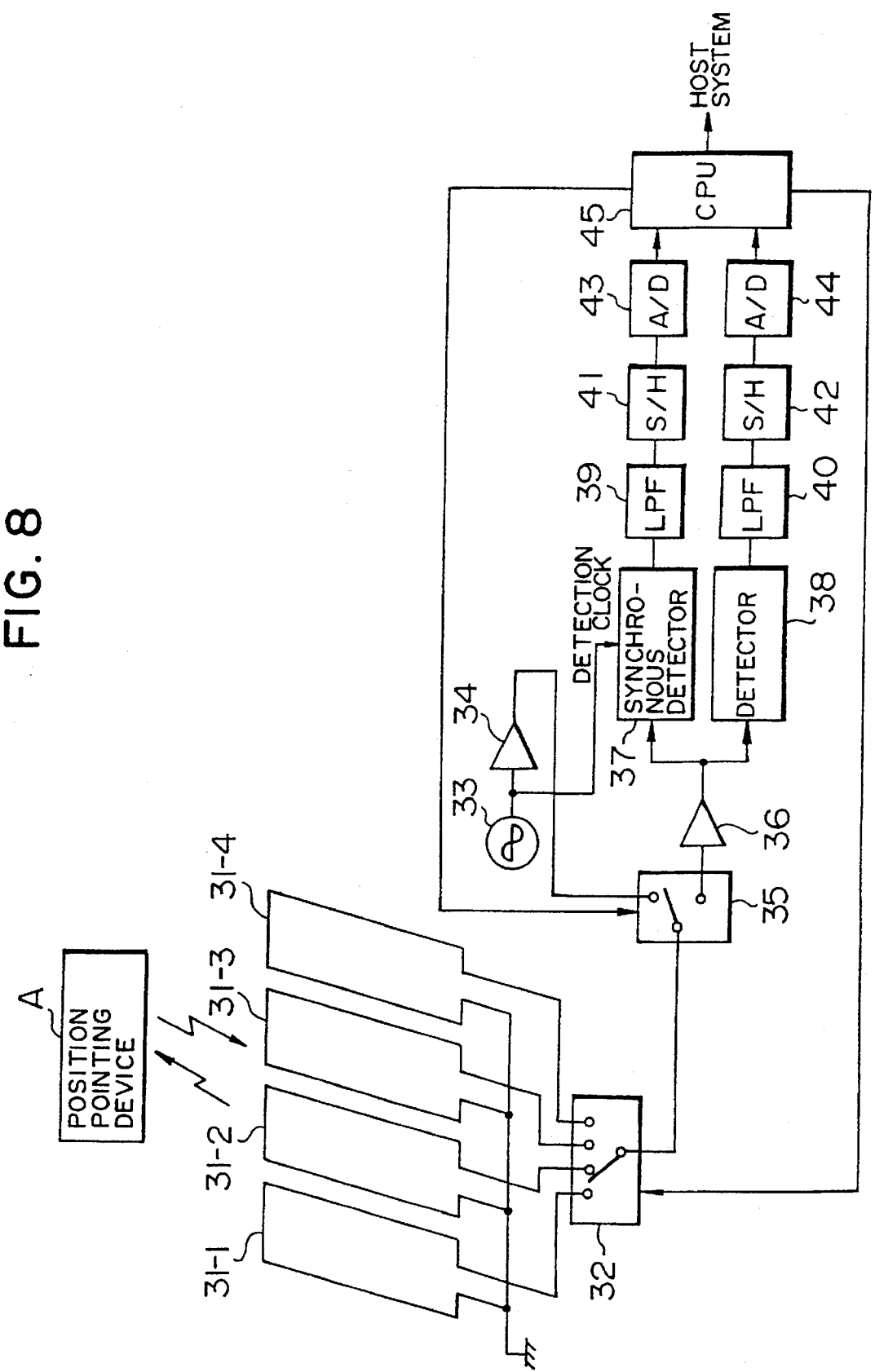
Figure 9:
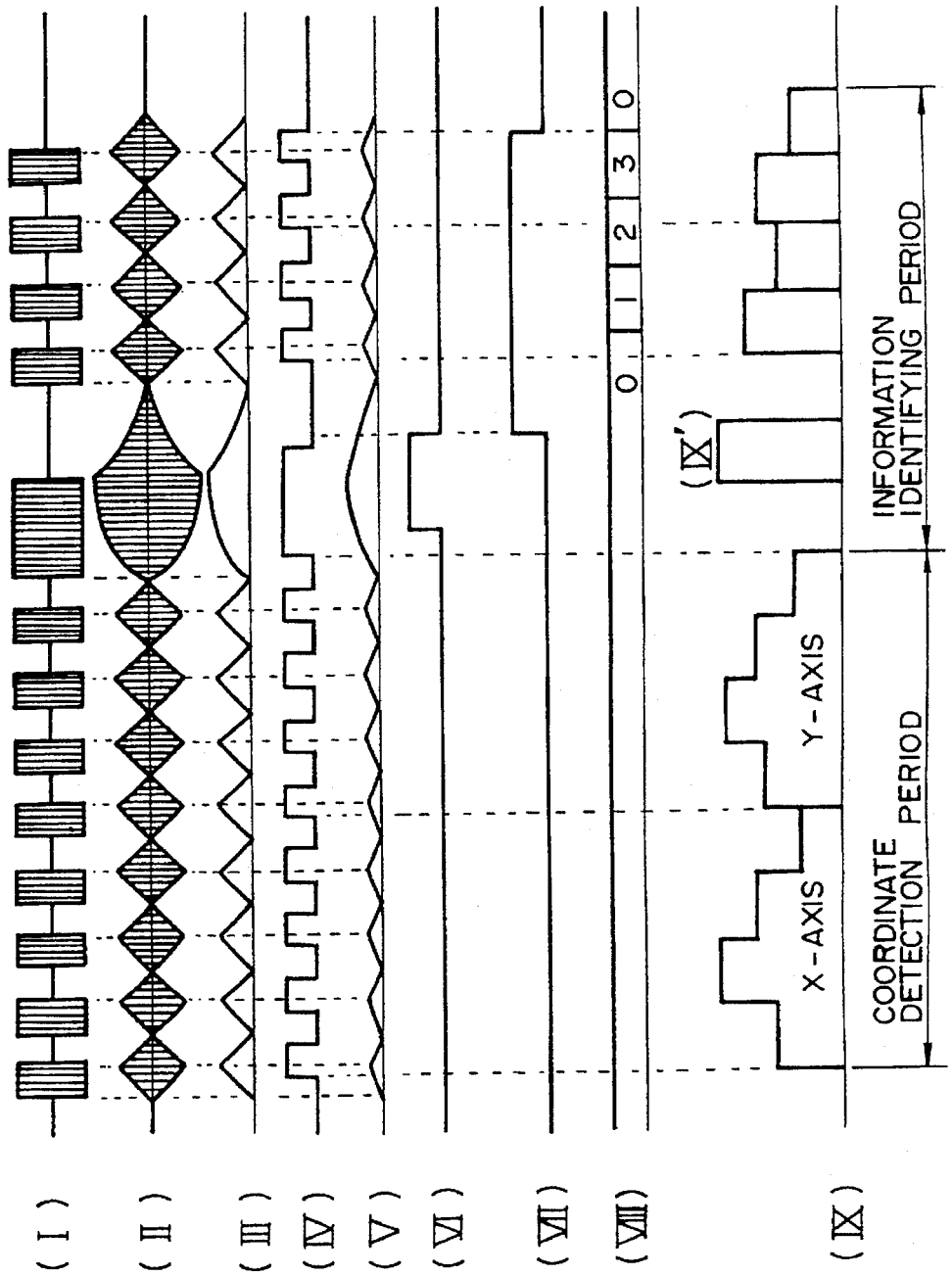
Figure 10:
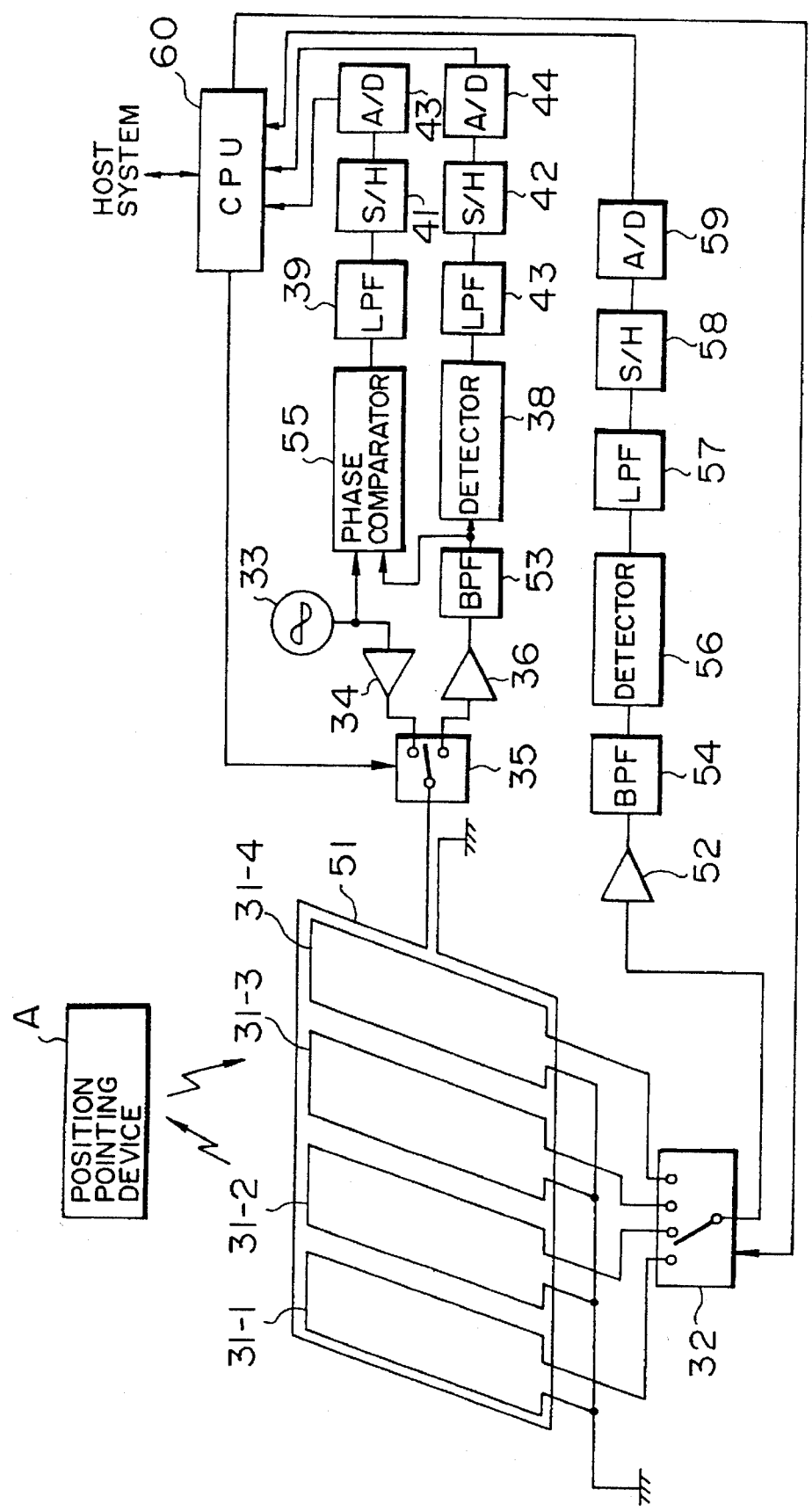
Figure 11:
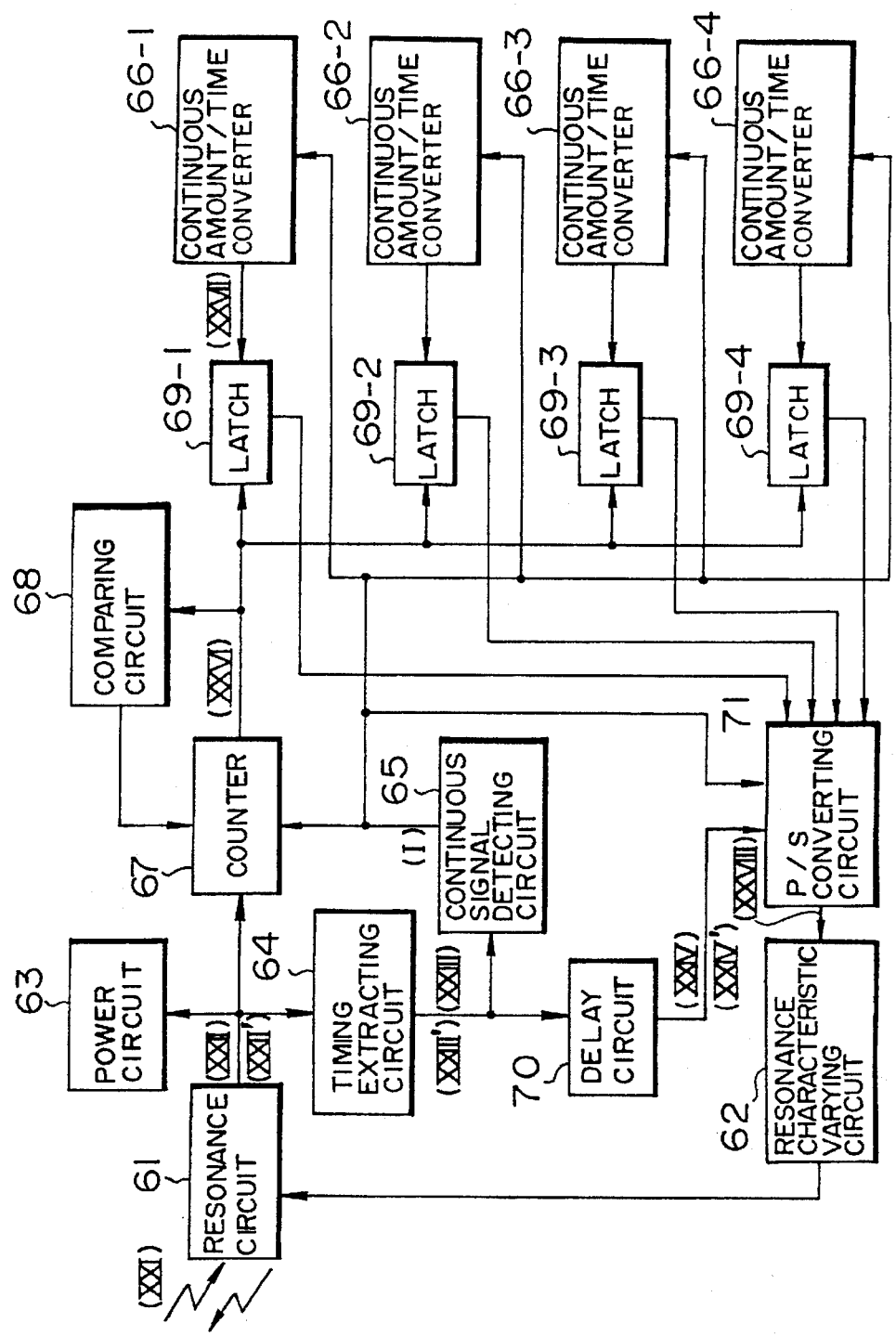
Figure 12:
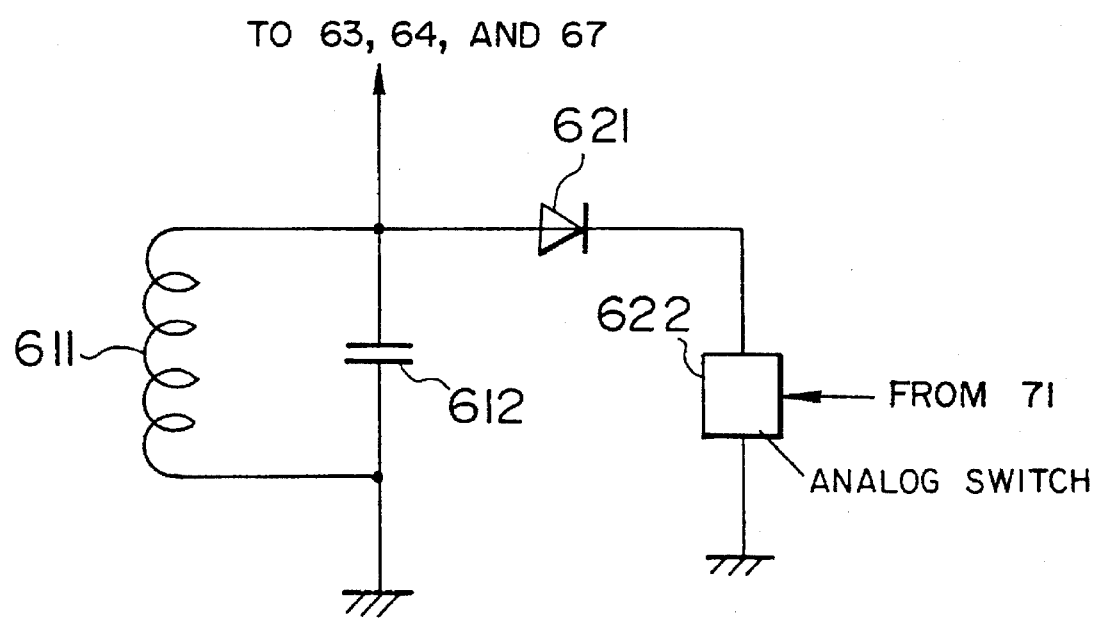
Figure 13:
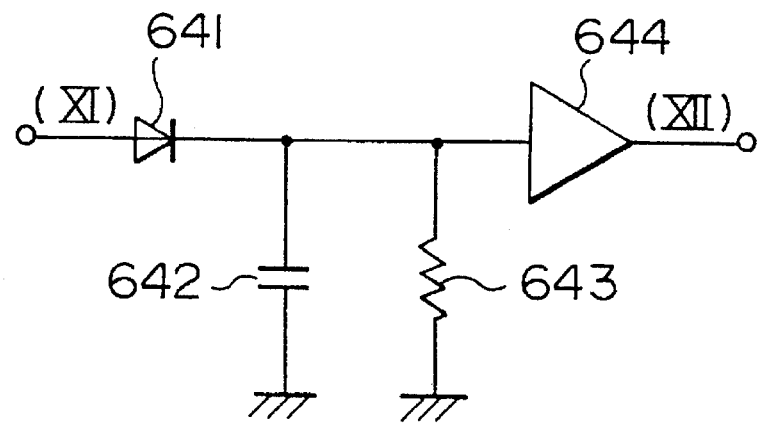
Figure 14:
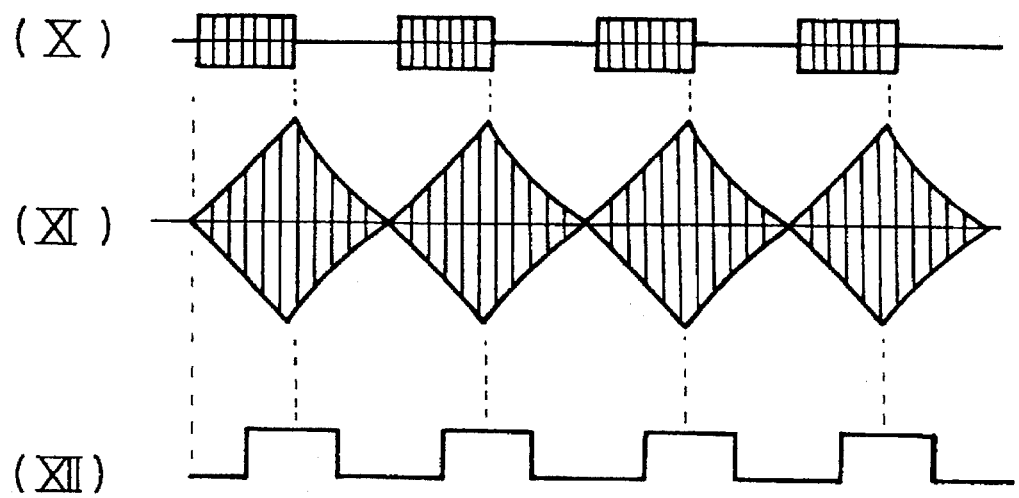
Figure 15:
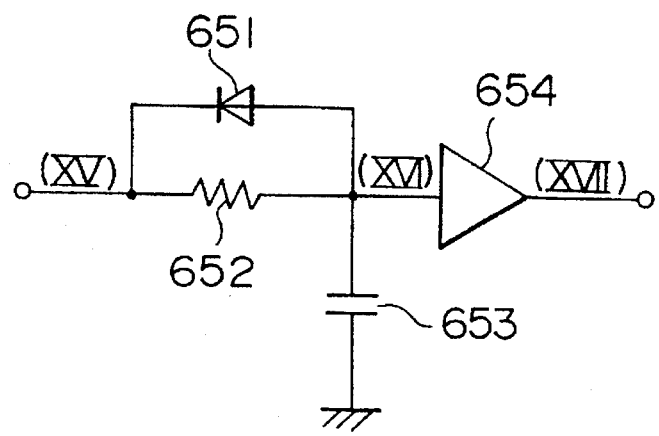
Figure 16:
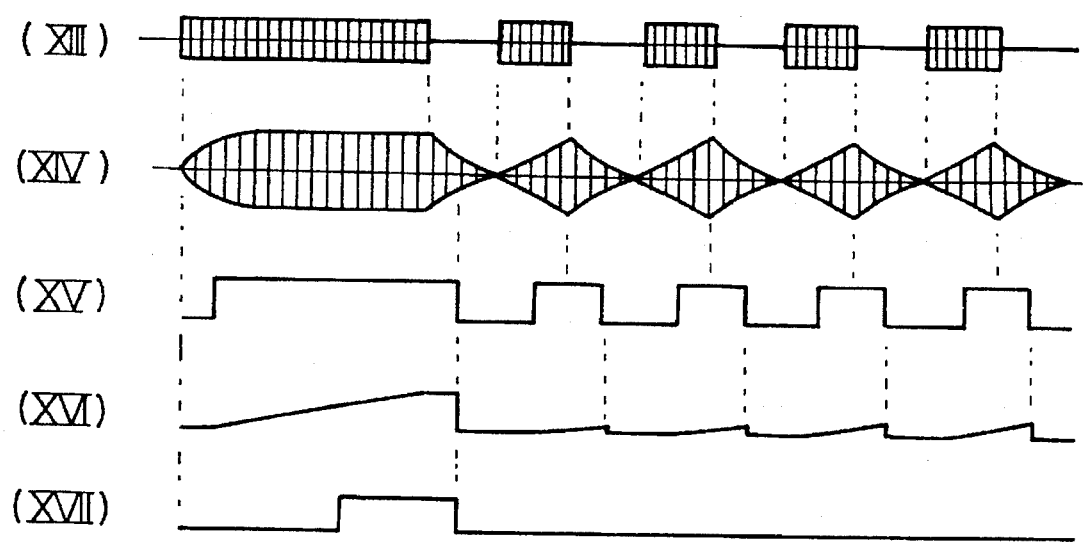
Figure 17:
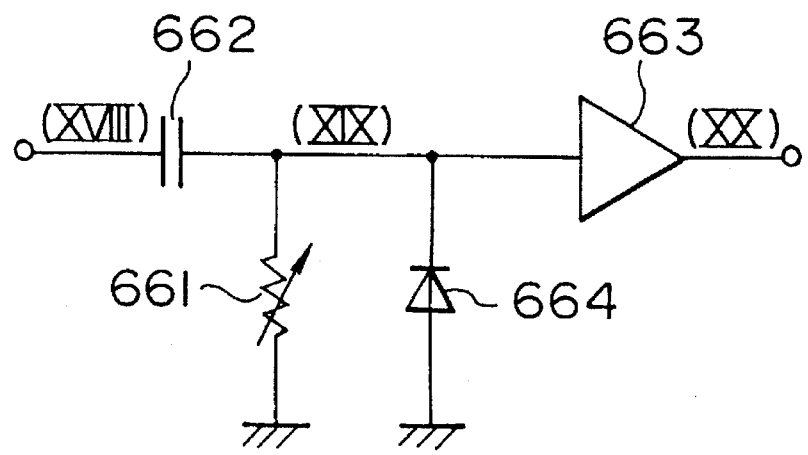
Figure 18:
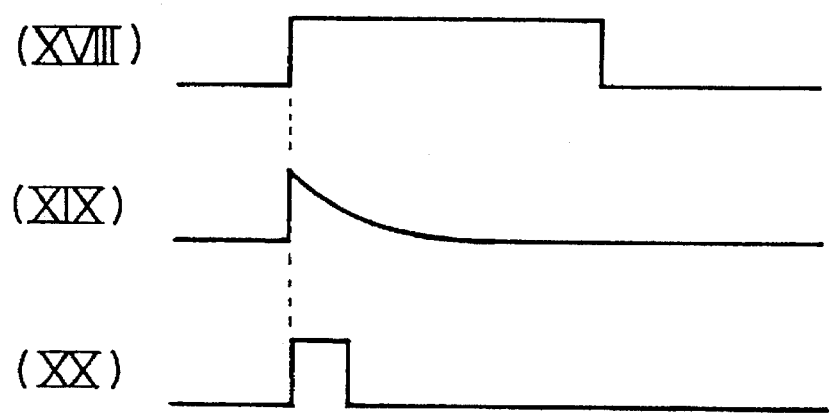
Figure 19:
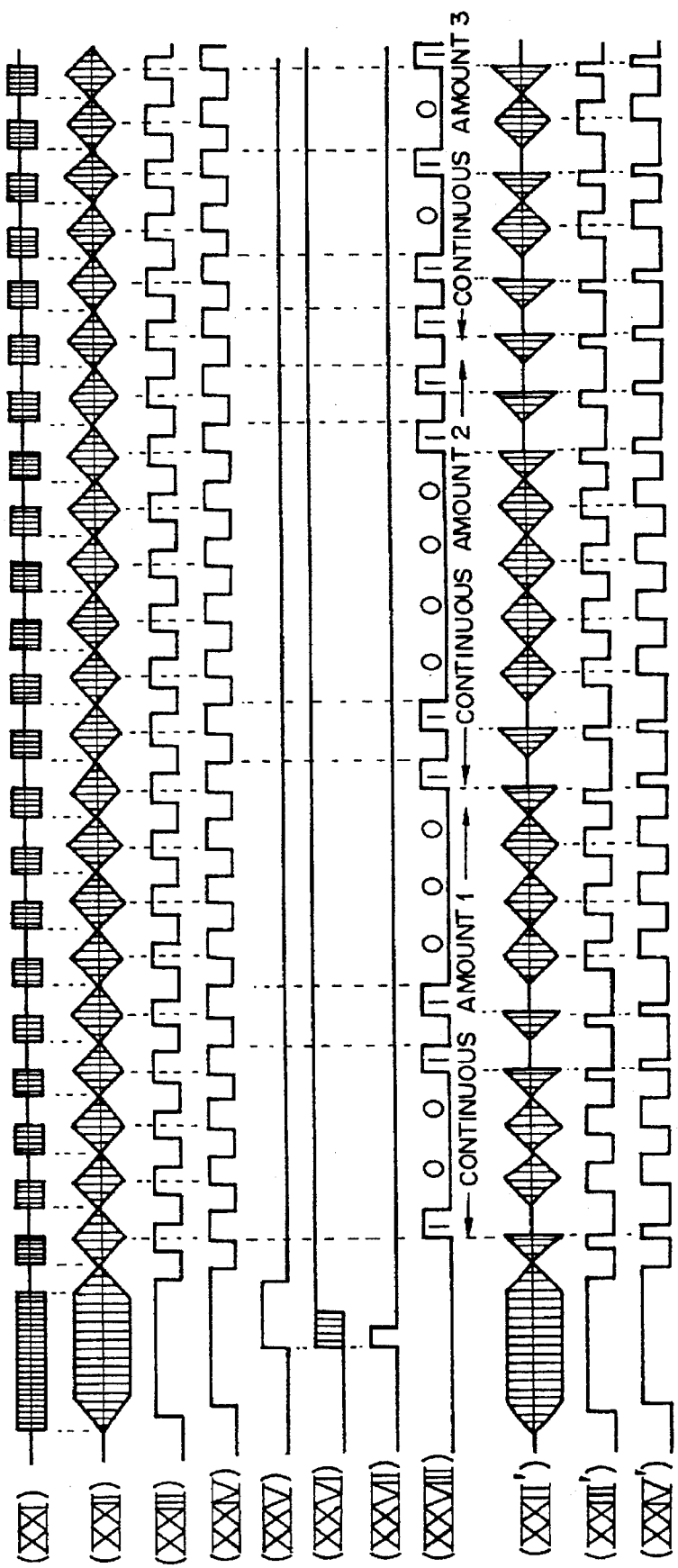
Figure 20:
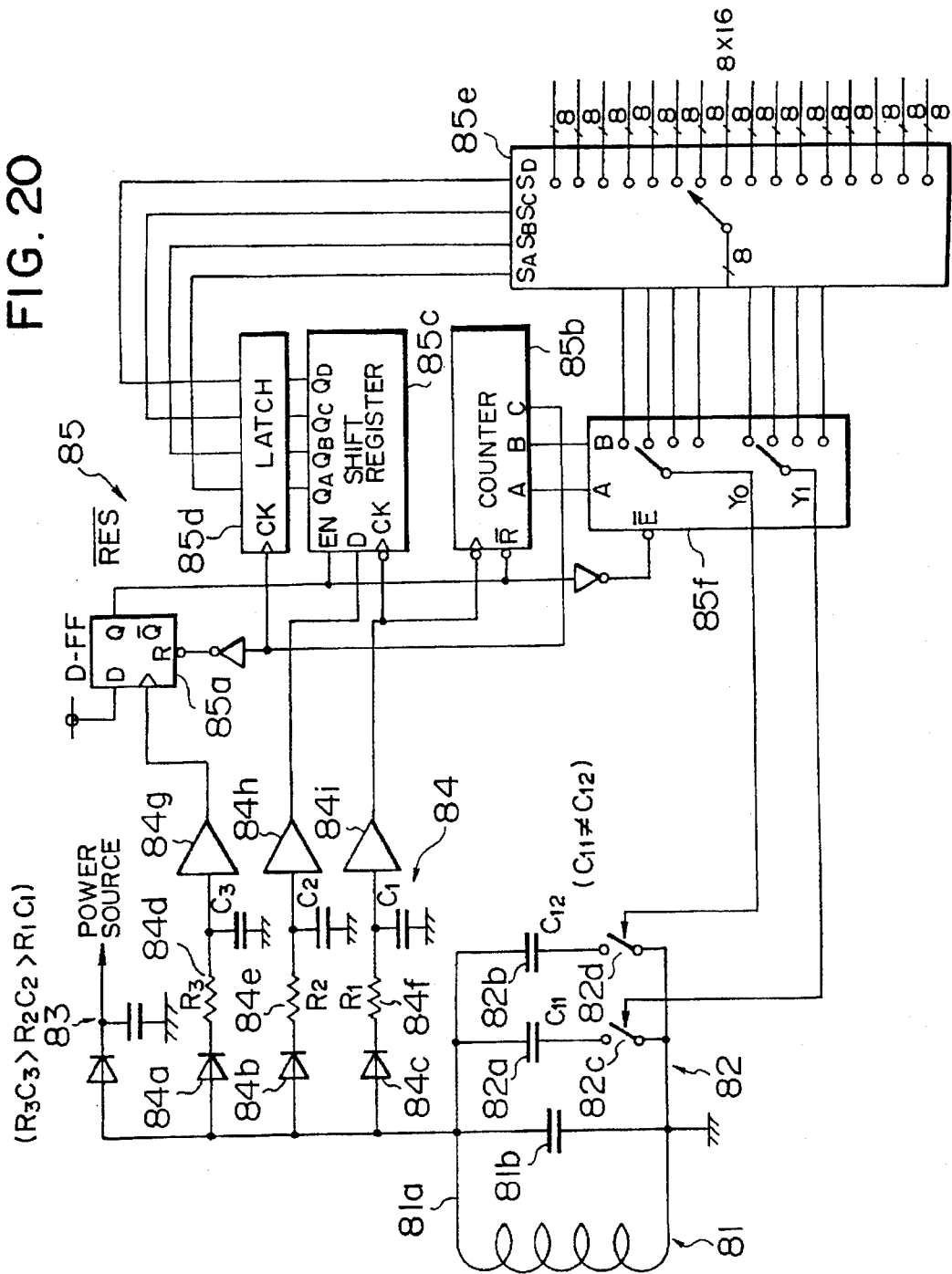
Figure 21:
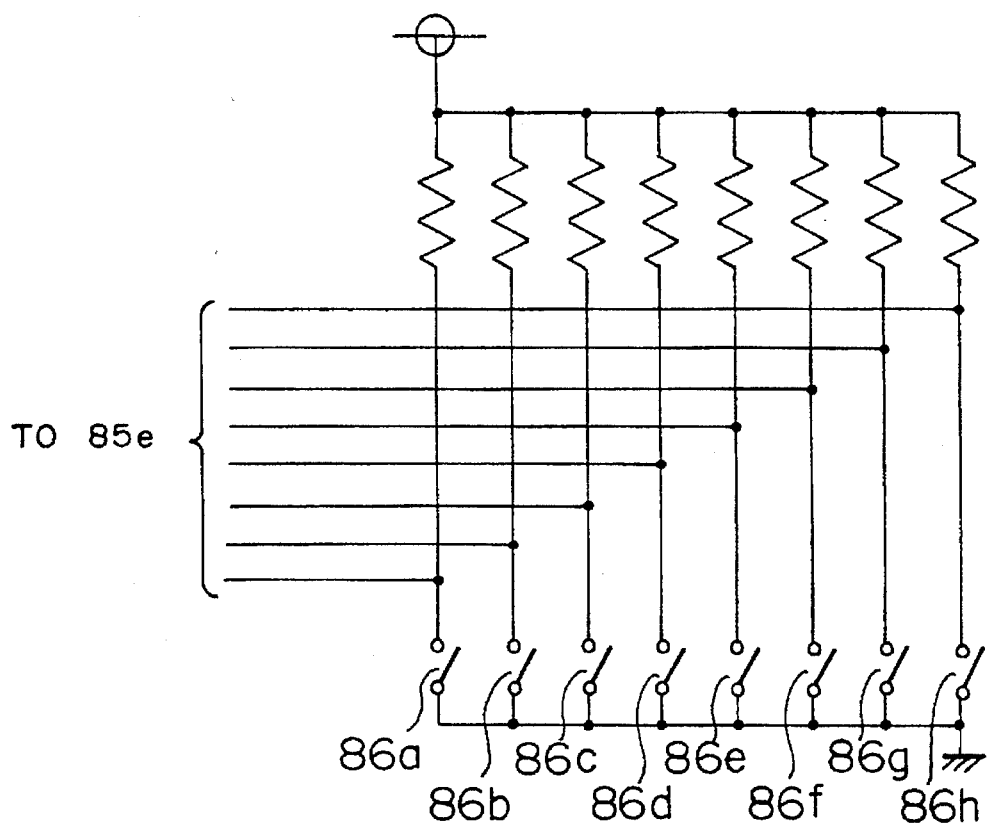
Figure 22:
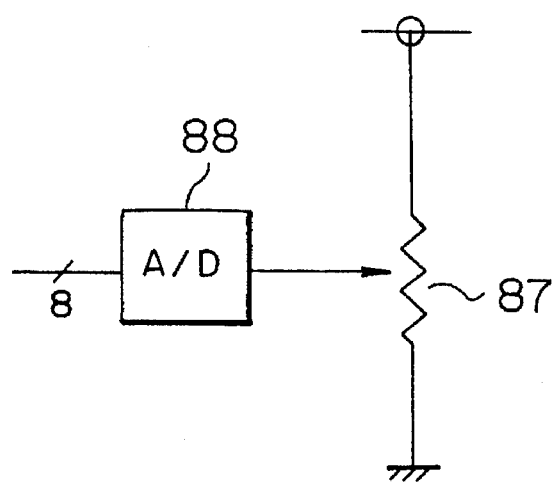
Figure 23:
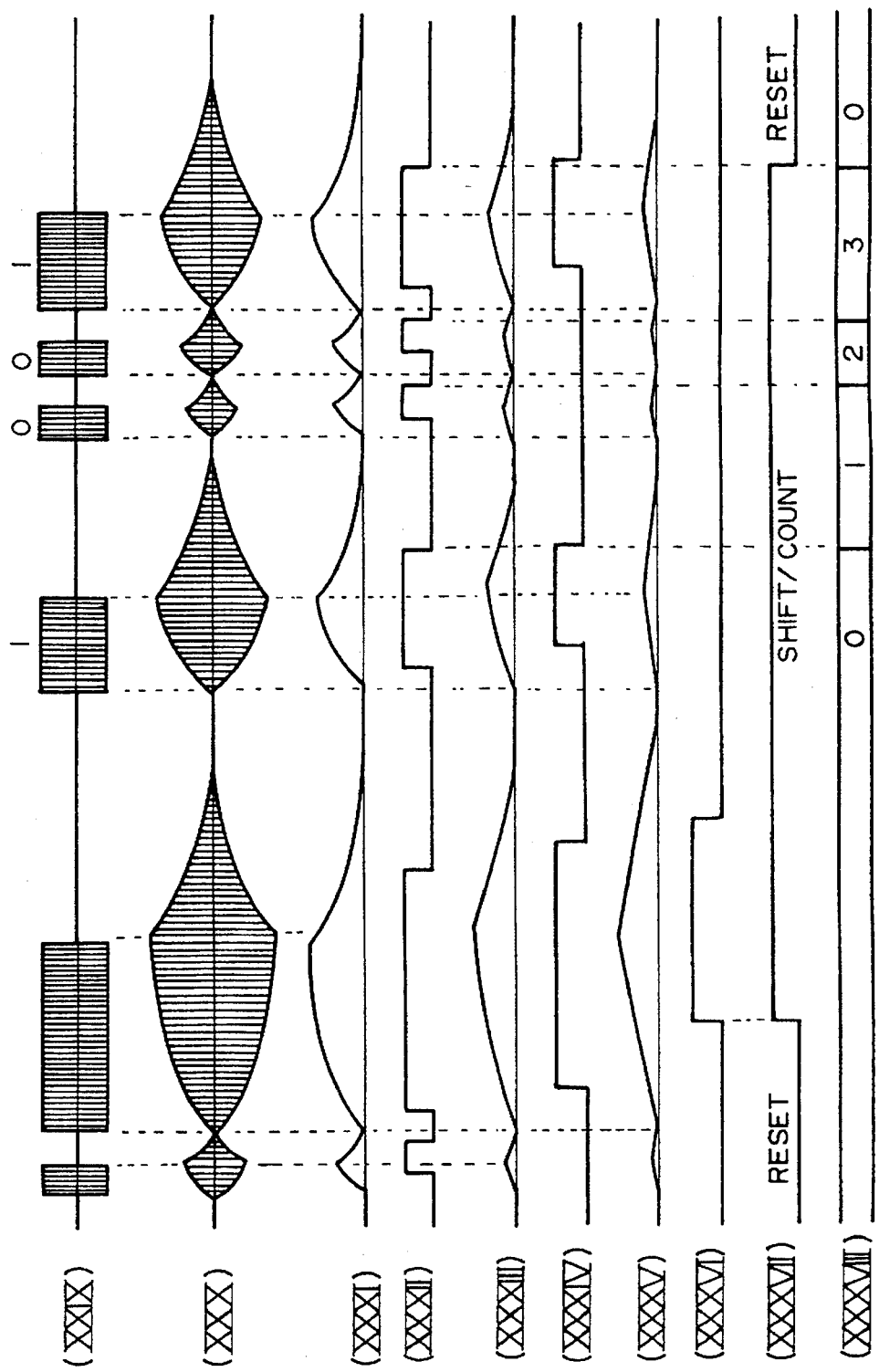

FIG. 4 is a block diagram illustrative of yet another basic form of the position pointing device in accordance with the present invention;

FIG. 5 is a block diagram illustrative of another basic form of the position pointing device in accordance with the present invention;

FIG. 6 is a configuration diagram showing a first embodiment of the position pointing device in accordance with the present invention;

FIG. 7 illustrates an example of the appearance of the position pointing device in accordance with the present invention;

FIG. 8 is a configuration diagram showing an example of a position detecting device which employs the position pointing device;

FIG. 9 illustrates operation waveforms involved in the first embodiment;

FIG. 10 is a configuration diagram showing another example of the position detecting device which employs the position pointing device in accordance with the present invention;

FIG. 11 is a configuration diagram showing a second embodiment of the position pointing device in accordance with the present invention;

FIG. 12 illustrates an example of a resonance circuit and a resonance characteristic varying circuit of the device shown in FIG. 11;

FIG. 13 illustrates an example of a timing extracting circuit of the device shown in FIG. 11;

FIG. 14 illustrates examples of signal waveforms observed at various portions of the circuit shown in FIG. 13;

FIG. 15 illustrates an example of a continuous signal detecting circuit of the device shown in FIG. 11;

FIG. 16 illustrates examples of signal waveforms observed at various portions of the circuit shown in FIG. 15;

FIG. 17 illustrates an example of a continuous amount/time converting means of the device shown in FIG. 11;

FIG. 18 illustrates examples of signal waveforms observed at various portions of the means shown in FIG. 17;

FIG. 19 illustrates examples of signal waveforms observed at various portions of the device shown in FIG. 11;

FIG. 20 is a configuration diagram illustrative of a third embodiment of the position pointing device in accordance with the present invention;

FIG. 21 illustrates an example of a color information setting circuit which outputs eight bits of binary code;

FIG. 22 illustrates another example of the color information setting circuit which outputs eight bits of binary code; and FIG. 23 illustrates operation waveforms concerning the third embodiment.

DESCRIPTION OF THE PREFERRED EMBODIMENTS

Before turning to the description of preferred embodiments, a description will be given of various basic forms of the present invention.

Figure 1:
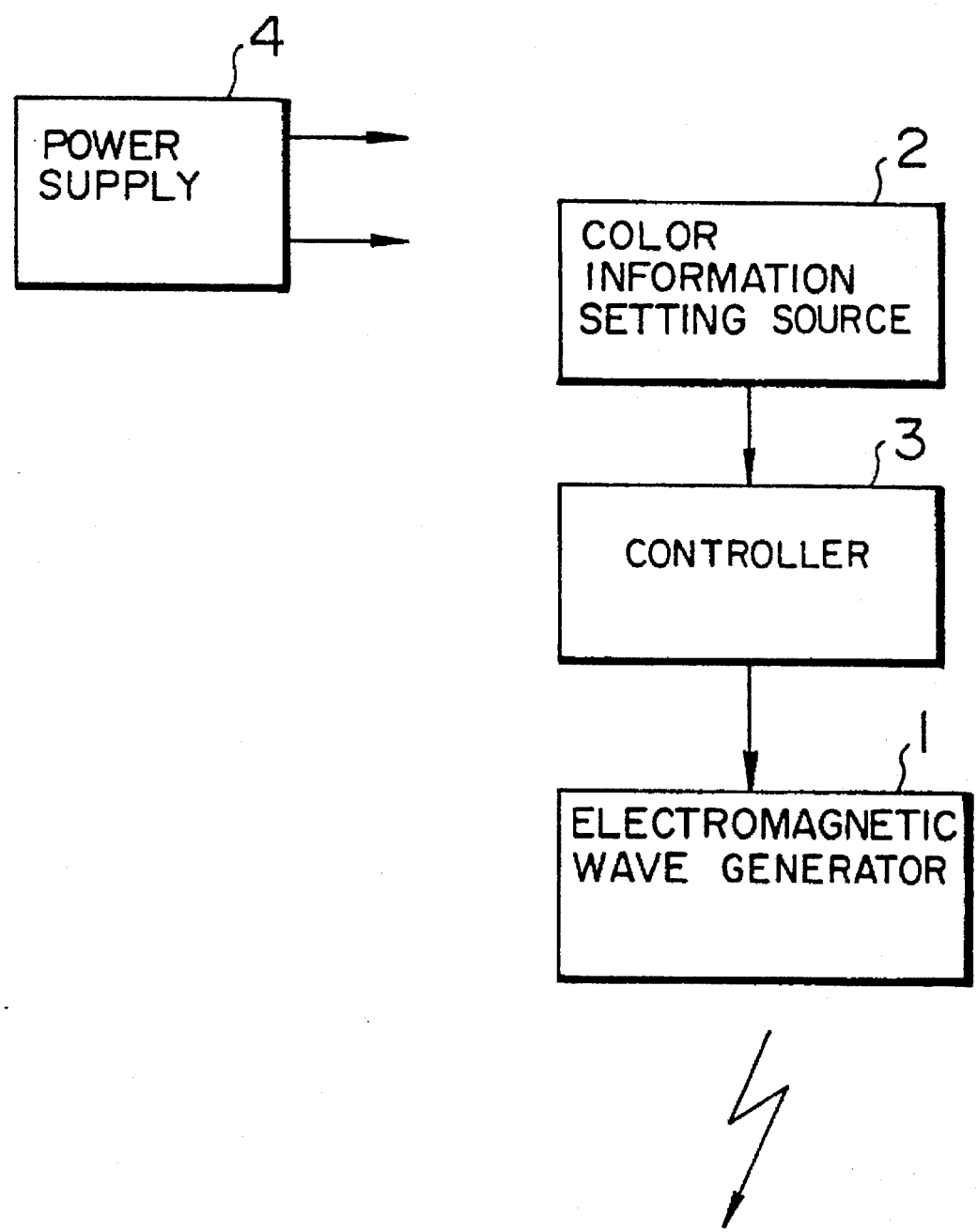
FIG. 1 is a block diagram illustrative of a basic form of the position pointing device in accordance with the present invention.

FIG. 1 shows a basic form of the position pointing device in accordance with the present invention. The position pointing device according to this basic form has an electromagnetic wave generating means 1 for generating an electromagnetic wave which has certain space distribution corresponding to the coordinate value of a pointed position and the intensity or frequency thereof varying in accordance with external control; a color information setting means 2 for setting detailed information concerning a plurality of factors defining a color; a control means 3 for controlling the aforesaid electromagnetic wave generating means 1 in accordance with the contents set by the color information setting means 2; and a power supplying means 4 for supplying power to the component units.

The control means 3 may be designed to control the electromagnetic wave generating means 1 in time series in accordance with set contents. Further, the detailed information regarding a plurality of factors defining a color in the color information setting means 2 may be expressed by a plurality of bits of binary code, so that the electromagnetic wave generating means 1 may be controlled in time series in accordance with the plurality of bits of binary code.

Figure 2:
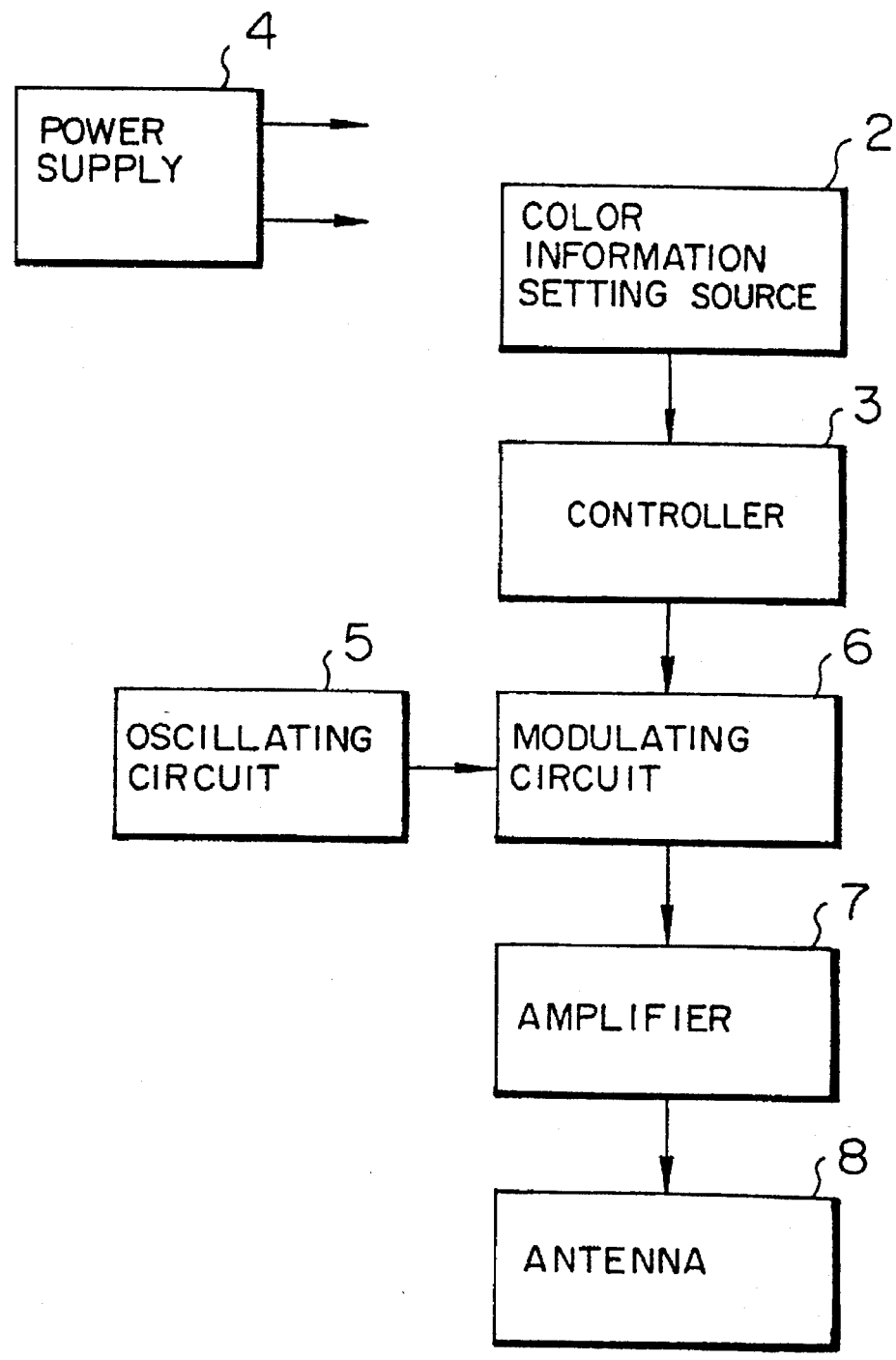
FIG. 2 is a block diagram illustrative of another basic form of the position pointing device in accordance with the present invention.

FIG. 2 shows another basic form of the position pointing device in accordance with the present invention which employs an electromagnetic wave generating means utilizing the modulation of electromagnetic wave. In the drawing, the same component units as those shown in FIG. 1 are given the same reference numerals. Thus, numeral 2 denotes the color information setting means, 3 the control means, 4 the power supplying means, 5 an oscillating circuit for generating an AC signal of a predetermined frequency, 6 a modulating circuit for modulating the AC signal of the predetermined frequency in accordance with external control, 7 an amplifier for amplifying the modulated signal, and 8 an antenna connected to the output of the amplifier 7.

Figure 3:
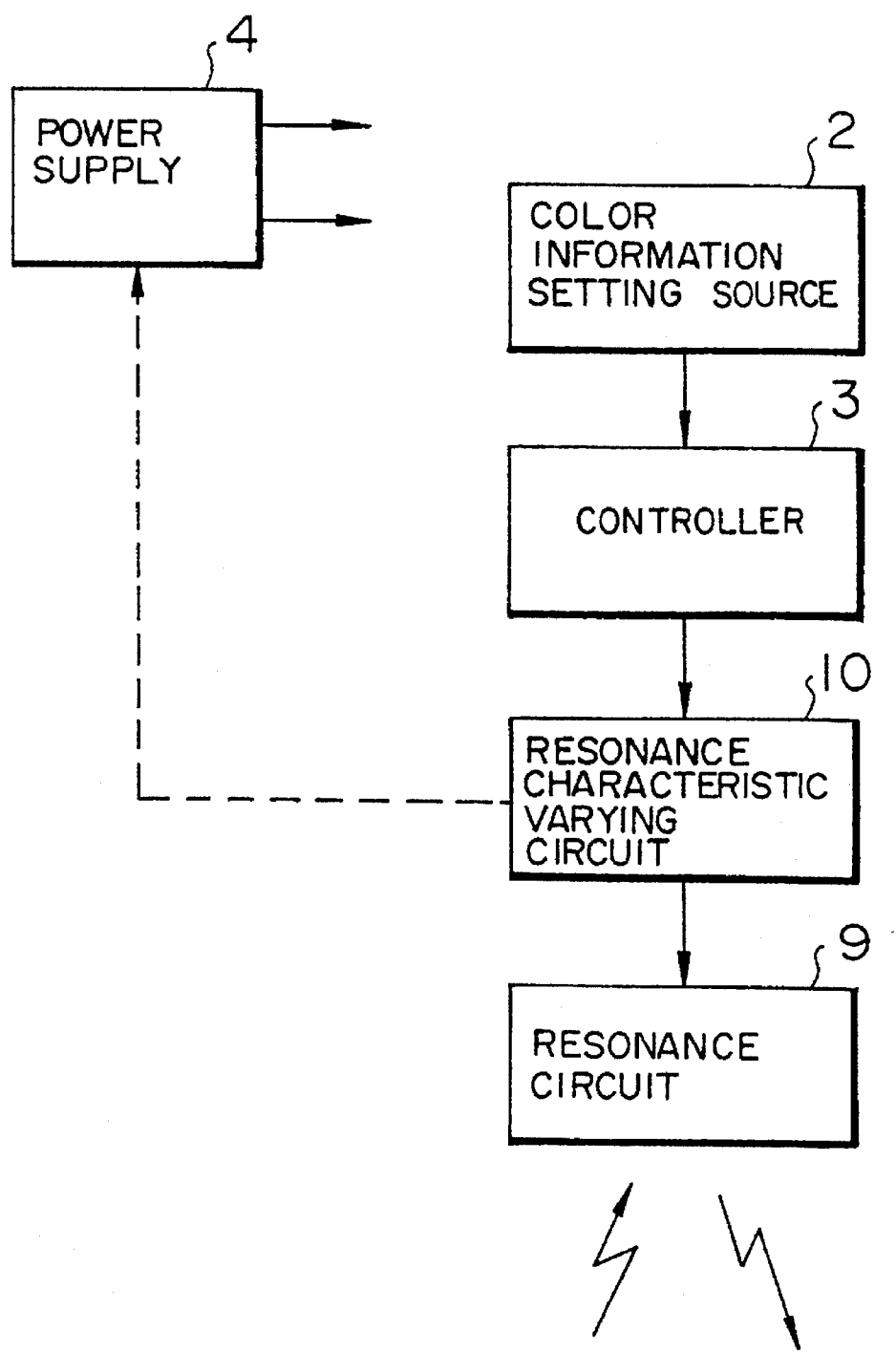
FIG. 3 is a block diagram illustrative of still another basic form of the position pointing device in accordance with the present invention.

FIG. 3 shows another basic form of the position pointing device in accordance with the present invention, which employs an electromagnetic wave generating means incorporating a resonance circuit. In the same component units as those shown in FIG. 1 are given the same reference numerals. Thus, numeral 2 denotes the color information setting means, numeral 3 the control means, numeral 4 the power supplying means, numeral 9 a resonance circuit having a predetermined resonance characteristic, and numeral 10 a resonance characteristic varying circuit for varying the predetermined resonance characteristic in accordance with external control.

A battery may be used as the power supplying means 4. If the device has the resonance circuit, then electrical energy for driving component units may be extracted from electromagnetic waves received by the resonance circuit.

FIG. 4 shows still another basic form of the position pointing device in accordance with the present invention, which is designed to input information on pen pressure in addition to the detailed information on a plurality of factors determining a color. In the drawing, the same component units as those shown in FIG. 1 are given the same reference numerals. Thus, numeral 2 denotes the color information setting means, numeral 3 the control means, numeral 4 the power supplying means, and numeral 11 a pressure converting means for detecting the pen pressure.

FIG. 5 shows still another basic form of the position pointing device according to the present invention, which is designed to operate in accordance with commands received from the position detecting device. The same component units as those shown in FIG. 1 are given the same reference numerals. Thus, numeral 1 denotes the electromagnetic wave generating means, numeral 2 the color information setting means, numeral 3 the control means, and numeral 4 the power supplying means. Numeral 12 denotes an electromagnetic waves containing commands from the position pointing device which is not illustrated, 13 a command extracting means for extracting the commands from the received electromagnetic waves, and 14 an initiation control means for activating the control means 3 in accordance with the commands.

Predetermined timing information may be used as the command mentioned above, so that the control means 3 may be activated at a plurality of particular timings based on the predetermined timing information. Further alternatively, a resonance circuit constituting the electromagnetic wave generating means may be employed as the electromagnetic wave receiving means.

In the basic form shown in FIG. 1, the electromagnetic wave generating means 1 normally generates an electromagnetic wave which has certain space distribution corresponding to the coordinate of a pointed position, e.g., an electromagnetic wave the intensity of which is the highest in a pointed position and weakens as the distance from the pointed position increases, or an electromagnetic wave the phase of which is reversed in the pointed position. The position detecting device, not shown, determines the coordinate value of the pointed position according to the space distribution of the electromagnetic wave. In the color information setting means 2, detailed information concerning a plurality of factors determining a color, e.g., detailed gradation information on basic colors such as red, green, and blue, is set, for example, as the impedance of a circuit element which varies in accordance with the operation. The control means 3 controls the intensity or frequency of electromagnetic waves emitted from the electromagnetic wave generating means 1 in accordance with the contents set by the color information setting means 2, i.e., the impedance of the circuit element in this example. The position detecting device detects the contents set by the color information setting means 2, namely, detailed color information from a variation in the intensity or frequency in the electromagnetic wave.

Many set contents, that is, much detailed color information can be entered by controlling the electromagnetic wave generating means 1 in time series the control means 3 in accordance with set contents. Furthermore, much detailed color information can be entered without errors by setting the detailed information on a plurality of factors defining a color by a plurality of bits of binary code and controlling the electromagnetic wave generating means 1 in time series in accordance with the plurality of bits of binary code.

In the configuration illustrated in FIG. 2, the Ac signal of a predetermined frequency which is generated by the oscillating circuit 5 is applied to the modulating circuit 6; it is then normally supplied to the antenna 8 via the amplifier 7 as it is and radiated as an electromagnetic wave having certain space distribution which corresponds to the coordinate value of a pointed position. At this time, when the control means 3 controls the modulating circuit 6 in accordance with the contents set by the color information setting means 2, the AC signal of the predetermined frequency is modulated in accordance with the contents set by the color information setting means 2, i.e., the detailed information concerning the plurality of factors defining a color, and the modulated AC signal is emitted from the antenna 8 in the form of an electromagnetic wave which has the certain space distribution corresponding to the coordinate value of a pointed position and which contains the detailed color information.

In the configuration illustrated in FIG. 3, the resonance circuit 9 receives the electromagnetic wave transmitted from the position detecting device and induced voltage occurs; the induced voltage causes the resonance circuit 9 to radiate an electromagnetic wave having certain space distribution which corresponds to the coordinate value of the pointed position. At this time, controlling the resonance characteristic varying circuit 10 by the control means 3 in accordance with the contents set by the color information setting means 2 causes the resonance characteristic of the resonance circuit 9 to vary in accordance with the contents set by the color information setting means 2, i.e., the detailed color information, and an electromagnetic wave is radiated from the resonance circuit 9, the electromagnetic wave having certain space distribution which corresponds to the coordinate value of the pointed position and containing the detailed color information.

Usually, a battery is used as the power supplying means 4 for supplying power to the component units. In this example, however, it is possible to extract electrical energy for driving component units from the electromagnetic wave received by the resonance circuit 9 and supply the extracted electrical energy as the power to the component units.

In the configuration shown in FIG. 4, the pressure converting means 11 detects, for example, the pen pressure applied to the tip of a pen-shaped enclosure, and the detection result is supplied to the control means 3 together with the contents set by the color information setting means 2. The control means 3 controls the electromagnetic wave generating means 1 in accordance with the set contents, namely, the detailed color information and the detecting result, so that the electromagnetic wave generating means 1 radiates an electromagnetic wave which has certain space distribution corresponding to the coordinate value of the pointed position and contains the detailed color information and pen pressure information.

In the configuration shown in FIG. 5, the electromagnetic wave containing the command transmitted from the position detecting device is received by the electromagnetic wave receiving means 12, the command is extracted from the command extracting means 13, and the extracted command is applied to the initiation control means 14. The initiation control means 14 activates the control means 3, e.g., it activates the control means 3 at a particular timing based on the command, and the activated control means 3 controls the electromagnetic wave generating means 1 in accordance with the contents set by the color information setting means 2.

The use of predetermined timing information as the command to initiate the control means 3 at a plurality of particular timings based on the predetermined timing information permits secure input of much color information. Moreover, the use of the resonance circuit constituting the electromagnetic wave generating means as the electromagnetic wave receiving means 12 eliminates the need of the installation of two antennas.

The following describes the embodiments according to the present invention with reference to the accompanying drawings.

FIG. 6 shows the first embodiment of the position pointing device according to the present invention. In the FIG., reference numeral 21a denotes a coil, numerals 21b and 22b denote capacitors, numerals 22a, 23a, and 24a diodes, numerals 23b and 24b low-pass filters (LPFs), numerals 23c and 24c comparators, numerals 25, 26, 27, and 28 variable-capacitance capacitors, numeral 29a a D flip-flop, numeral 29b a counter, numeral 29c an analog switch, and numerals 29d and 29e inverters.

The coil 21a and the capacitor 21b are connected in series and they constitute a well-known resonance circuit 21 which has a predetermined frequency as the resonance frequency thereof. The diode 22a and the capacitor 22b constitute a power circuit 22 which takes out DC voltage from the induced voltage occurring in the resonance circuit 21 and supplies it as a line voltage to other circuits.

The diode 23a, the low-pass filter 23b, and the comparator 23c constitute an actuation timing generating circuit 23, which takes out only the induced voltage lasting for a predetermined period of time or longer from the induced voltage generated in the resonance circuit 21 by using the low-pass filter 23b having a relatively large time constant (t), then shapes the waveform thereof to produce an actuation timing signal. The diode 24a, the low-pass filter 24b, and the comparator 24c constitute a clock generating circuit 24, which takes out the induced voltage, which is intermittently generated for a fixed duration, which is sufficiently shorter than the predetermined period of time, at predetermined intervals, from the induced voltage generated in the resonance circuit 21 by means of the low-pass filter 24b having a relatively small time constant (t), then shapes the waveform thereof to produce a clock. The actuation timing generating circuit 23 and the clock generating circuit 24 constitute the timing extracting means mentioned in claim 10.

The variable-capacitance capacitor 25 is a pressure variable-capacitance capacitor the capacitance of which varies in accordance with the pressure applied to a pen tip 25' as shown in FIG. 7, i.e., the pen pressure.

The capacitor 25 constitutes the pressure converting means mentioned in claim 8.

The variable-capacitance capacitors 26, 27, and 28 are variable capacitors the capacitances of which vary in accordance with the set angles of means for setting detailed gradation information on red, blue, and green, e.g., set angles of rotary dial rings 26', 27', and 28' shown in FIG. 7. These capacitors 26 through 28 constitute the color information setting means mentioned in claims 1 and 2.

The variable-capacitance capacitors 25 through 28 constitute the resonance characteristic varying circuit mentioned in claim 5, one of which is connected in parallel to the capacitor 21b of the resonance circuit 21 via the analog switch 29c at a plurality of particular timings, which will be discussed later, in order to continuously vary the resonance characteristic, i.e., the resonance frequency in this case, of the resonance circuit 21 in accordance with the aforesaid pen pressure information and the detailed gradation information on red, blue, and green. The range over which the capacitance values vary in accordance with the operation of the variable-capacitance capacitors 25 through 28 is set so that it coincides with a range (about −60° to about +60°) over which the variations in the resonance frequency of the resonance circuit 21 caused by the variations in the capacitance values which result from the operation of the capacitance-variable capacitors 25 through 28 can be detected in the form of phase angles in relation to the foregoing predetermined frequency.

The D flip-flop 29a is set when the actuation timing signal is received via the inverter 29d; it clears the resetting of the counter 29b and enables the analog switch 29c. The D flip-flop 29a is reset when it receives via the inverter 29e information telling that the count value of the third digit from the bottom on the counter 29b has reached 1; it resets the counter 29b and disables the analog switch 29c. The counter 29b counts the clocks while the resetting thereof is being cleared and it sends the lower two digits of the count value to the analog switch 29c. When the analog switch 29c is in an enabled state, it connects one of capacitance-variable capacitors 25 through 28 to the capacitor 21b in parallel one after another in accordance with a count value, namely, "00", "01", "10" or "11" received from the counter 29b. The circuit composed of the parts denoted by numerals 29a through 29e constitutes the initiation control means 29 which connects in sequence the plurality of capacitance-variable capacitors 25 through 28 to the resonance circuit 21 in synchronization with a clock which follows the input of the actuation timing signal.

FIG. 8 shows an example of the position detecting device which employs the position pointing device in accordance with the present invention. In the FIG., numerals 31-1, 31-2, 31-3, and 31-4 denote loop coils, numeral 32 a selector circuit, numeral 33 an oscillator, numeral 34 a current driver, numeral 35 a transmit/receive switching circuit, numeral 36 a receiving amplifier 36, numeral 37 a synchronous detector, numeral 38 a detector, numerals 39 and 40 low-pass filters (LPFs), numerals 41 and 42 sample holding circuits (S/H), numerals 43 and 44 analog-to-digital (A/D) converting circuits, and numeral 45 a central processing unit (CPU).

The loop coils 31-1 through 31-4 are arranged nearly in parallel to each other in the position detecting direction, one end of each of them being connected to the selector circuit 32, while the other end being grounded in common. The selector circuit 32 selects one of the loop coils 31-1 through 31-4 in accordance with a selection signal received from the central processing unit 45 in a manner to be discussed later.

The oscillator 33 generates a sinusoidal AC signal having the aforesaid predetermined frequency and sends it to the current driver 34 and the synchronous detector 37. The current driver 34 converts the AC signal to an electric current and sends it to the transmit/receive switching circuit 35. The transmit/receive switching circuit 35 connects a loop coil, which has been selected by the selector circuit 32, to the current driver 34 and the receiving amplifier 36 alternately in a manner to be discussed later in accordance with a transmit/receive switching signal received from the central processing unit 45.

The receiving amplifier 36 amplifies the induced voltage, which is generated in the preselected loop coil and sent to the receiving amplifier 36 via the selector circuit 32 and the transmit/receive switching circuit 35, and sends the amplified induced voltage to the synchronous detector 37 and the detector 38.

The synchronous detector 37 synchronously detects the induced voltage generated in the preselected loop coil, i.e., the received signal, with the AC signal received from the oscillator 33 used as the detection signal and sends it to the low-pass filter 39. The detector 38 detects the induced voltage generated in the preselected loop coil, i.e., the received signal, and sends it to the low-pass filter 40.

The low-pass filters 39, 40 have a cut-off frequency, which is sufficiently lower than the resonance frequency of the resonance circuit 21, and they convert the output signals of the synchronous detector 37 and the detector 38 into DC signals and send them out to the A/D converting circuits 43, 44 via the sample holding circuits 41, 42. The A/D converting circuits 43, 44 respectively subject the outputs of the low-pass filters 39, 40 to the analog-to-digital conversion and send them out to the central processing unit 45.

The central processing unit 45 calculates the position of the resonance circuit 21 in accordance with the level distribution of the received signals, which were generated in the loop coils 31-1 through 31-4 during the coordinate detection period to be discussed later and which have been converted to digital values by the A/D converting circuit 44, and detects a phase difference in accordance with the level differences in the received signals, which were produced in the loop coil located most closely to the position of the resonance circuit 21 among the loop coils 31-1 through 31-4 at a timing immediately after the electric wave was generated continuously for a predetermined period of time or longer during the information identifying period to be discussed later and also at a timing immediately after each timing, at which the electric wave was generated intermittently for a fixed duration, which is sufficiently shorter than the predetermined period of time, at predetermined intervals, the received signals having been converted to digital values through the A/D converting circuit 43. The central processing unit 45 further detects an internal loss in accordance with the level differences in the received signals, which have been converted to digital values through the A/D converting circuit 44 (however, the internal loss remains unchanged in the position pointing device of FIG. 6), detects the resonance characteristics of the resonance circuit 21 at each timing mentioned above, and reproduces the pen pressure information and detailed gradation information on red, blue, and green by referring to a table showing the relationship between the resonance characteristics and the respective types of information, the relationship being determined in advance.

FIG. 9 illustrates the operation waveforms observed when the position pointing device of FIG. 6 is used with the position detecting device shown in FIG. 8. The following describes the operations of the position detecting device and the position pointing device in connection with the FIG.. The position detecting device of FIG. 8 is designed for position detection in one direction; however, in this embodiment, a plurality of loop coils similar to the loop coils 31-1 through 31-4 are arranged so that they cross orthogonally therewith, a selector circuit similar to that described above is provided, and an additional circuit is selectively used so as to perform alternate position detection, thus detecting a pointed position in two orthogonal directions (x and y directions). The FIG. shows the waveforms obtained from the configuration described above.

The operations of the devices according to this embodiment are roughly divided into those carried out during the coordinate detection period and those carried out during the information identifying period, and these two types of operations are normally repeated alternately. Normally, only the coordinate detection period is provided, the information identifying period being provided only when necessary.

During the coordinate detection period, the central processing unit 45 controls the transmit/receive switching circuit 35 so that the output of the selector circuit 32 is connected to the current driver 34 and the receiving amplifier 36 alternately for a predetermined duration at fixed intervals, and also controls the selector circuit 32 so that the loop coil located most closely to position pointing device A is selected among the loop coils 31-1 through 31-4 while the output of the selector circuit 32 is being connected to the current driver 34, i.e., while the electric current is being generated, and the loop coils 31-1 through 31-4 are selected in sequence while the output of the selector circuit 32 is being connected to the receiving amplifier 36, i.e., while the electric wave is being detected.

During the information identifying period, the processing unit 45 controls the transmit/receive switching circuit 35 so that the output of the selector circuit 32 is connected continuously to the current driver 34 for not less than a predetermined period of time, which is sufficiently longer than the predetermined duration mentioned above, and after that connected alternately to the current driver 34 and the receiving amplifier 36 for a fixed duration, which is sufficiently shorter than the predetermined period of time, at predetermined intervals, and it also controls the selector circuit 32 so that the loop coil located most closely to position pointing device A is selected among the loop coils 31-1 through 31-4 while the output of the selector circuit 32 is being connected to the current driver 34, i.e., while the electric current is being generated and also while it is being connected to the receiving amplifier 36, i.e., while the electric current is being detected.

The operation of the position detecting device during the coordinate detection period will be omitted because it is already disclosed in the previously mentioned Japanese Patent Laid-Open Nos. 63-70326, 2-162410, etc. Electric current I, which is generated for a predetermined duration at fixed intervals in the loop coil closest to the resonance circuit 21 of the position pointing device during the coordinate detection period, causes similar induced voltage II to appear in the resonance circuit 21 of the position pointing device. Induced voltage II is shaped into clock IV by the comparator 24c via the diode 24a and the low-pass filter 24b (III) of the clock generating circuit 24 and clock IV is supplied to the counter 29b. At this time, however, there is no actuation timing signal; therefore, the counter 29b does not initiate counting and the analog switch 29c is not actuated. Accordingly, the resonance characteristics of the resonance circuit 21 remain unchanged.

During the information identifying period, which follows the coordinate detection period, when electric wave I lasting for not less than a predetermined period of time, which is sufficiently longer than the aforesaid predetermined duration, is emitted from the loop coil closest to the resonance circuit 21 of the position pointing device, electric wave I causes like induced voltage II to appear in the resonance circuit 21 of the position pointing device. Induced voltage II in turn causes the comparator 23c to generate actuation timing signal VI via the diode 23a and the low-pass filter 23b (V) of the actuation timing generating circuit 23. Actuation timing signal VI sets (VII) the D flip-flop 29a via the inverter 29d, causes the counter 29b to initiate counting, and enables the analog switch 29c.

After that, electric wave I generated in the loop coil closest to the resonance circuit 21 of the position pointing device for a fixed duration, which is sufficiently shorter than the predetermined period of time, at predetermined intervals, causes like induced voltage II to be generated in the resonance circuit 21 of the position pointing device, and it is shaped into clock IV before it is supplied to the counter 29b, output value VIII of the counter 29b incrementing each time clock IV is received.

Induced voltage II based on the electric wave, which has lasted for the predetermined period of time or longer, causes received signal (induced voltage) IX' to be produced in the loop coil of the position detecting device, which is located most closely to the resonance circuit 21 of the position pointing device as in the coordinate detection period. At this point, however, the D flip-flop 29a is in the reset state and the analog switch 29c is in the disabled state; therefore, none of the variable-capacitance capacitors 25 through 28 are connected to the resonance circuit 21. Hence, the output values of the A/D converting circuits 43, 44 based on the induced voltage IX' provide the reference values for detecting the phase difference and internal loss, respectively.

Then, the D flip-flop 29a is set, causing the analog switch 29c to be enabled, and the analog switch 29 c connects the variable-capacitance capacitors 25 through 28 one by one to the resonance circuit 21 each time output value VIII of the counter 29b is updated, thereby varying the resonance characteristic of the resonance circuit 21.

Such a variation in the resonance characteristic causes a variation in the frequency or voltage value of induced voltage IX generated in the loop coil of the position detecting device, which is closest to the resonance circuit 21 of the position pointing device; the variation is sent out from the A/D converting circuit 43 or 44 as an output value, which has a level difference from the output value based on induced voltage IX'. The central processing unit 45 compares the output values of the A/D converting circuits 43, 44, which are obtained in synchronization with the timing of the electric wave, which is intermittently produced for a fixed duration at predetermined intervals, with the output values of the A/D converting circuits 43, 44, which are obtained in synchronization with the timing of the electric wave, which is continuously generated for the predetermined period of time or longer, in order to detect the phase difference and internal loss. The central processing unit 45 also detects the variation in the resonance characteristic, namely, the variation in the resonance frequency caused by the capacitance-variable capacitors 25 through 28. Based on the detected phase difference and internal loss, the central processing unit 45 reproduces the four kinds of information, namely, the information on the pen pressure, and the detailed gradation information on red, that on blue, and that on green, and send these kinds of information to a host system together with the coordinate value of the pointed position.

After that, the coordinate detection period comes again and the same coordinate detection and information identification as those discussed above are repeated.

Thus, according to this embodiment, the detailed gradation information on red, blue, and green can be set by an easy operation based on the rotational angles of the dial rings 26', 27', and 28'. In addition, the pen pressure information can be entered simply by pressing the tip of the enclosure. These two features have made it possible to provide a position pointing device which is characterized by very good man-machine interface. Furthermore, the power circuit 22 supplies power for driving the component units from the induced voltage generated in the resonance circuit 21, eliminating the need of auxiliary power supplying means such as batteries. Moreover, the actuation timing generating circuit 23 and the clock generating circuit 24 cause the capacitance-variable capacitors 25 through 28 to be connected to the resonance circuit 21 only when the predetermined timing information is extracted; therefore, the pen pressure information and the detailed gradation information on red, blue, and green can be transmitted only when the position detecting device requires them. In addition, the resonance frequency of the resonance circuit 21 is changed in accordance with the capacitances of the variable-capacitance capacitors 25 through 28 at a plurality of particular timings, and the variations in the resonance frequency of the resonance circuit 21 are determined from the phase differences between the induced voltages occurring at the plurality of particular timings and the transmitted electric waves. This makes it possible for the varying range of the resonance frequency corresponding to a preselected kind of information to coincide with the range over which variations in the resonance frequency Can be detected as the phase angles with respect to the predetermined frequency. Hence, the varying range of transmissive information is not limited, and moreover, only one type of frequency is required for the electric waves transmitted from the position detecting device, eliminating the need for a wider frequency domain.

FIG. 10 illustrates another example of the position detecting device to which the position pointing device according to the present invention is applied. In this example, an auxiliary antenna coil is used to generate electromagnetic waves and to receive electromagnetic waves related to information identification. In the FIG., numeral 51 denotes an auxiliary antenna coil, which is arranged so as to surround the loop coils 31-1 through 31-4, one sides thereof being connected to a switching circuit 35, while the other sides thereof being grounded. Numeral 52 denotes a receiving amplifier connected directly to the selector circuit 32.

Numerals 53, 54 indicate band-pass filters which employ the predetermined frequency, i.e., the resonance frequency of the resonance circuit 21, as the center frequency. The band-pass filters 53, 54 take out only components in the vicinity of the resonance frequency from the induced voltage mentioned above via the receiving amplifiers 36 and 52, respectively. Numeral 55 denotes a phase comparator, which compares the phase of an output signal of the band-pass filter 53, i.e., the resonance frequency component of the induced voltage generated in the auxiliary antenna coil 51, and the phase of the AC signal received from the oscillator 33 and sends out a phase difference signal to the low-pass filter 39.

A detector 56, a low-pass filter (LPF) 57, a sample holding circuit (S/H) 58, and an analog-to-digital (A/D) converting circuit 59 detect received signals, which are generated in the loop coils 31-1 through 31-4 and output via the selector circuit 32, the receiving amplifier 52, and the band-pass filter 54, convert them into DC signals, and further convert the DC signals to digital signals.

A central processing unit (CPU) 60 calculates the position of the resonance circuit 21 in accordance with the level distribution of the received signals, which were generated in the loop coils 31-1 through 31-4 during the coordinate detection period and which have been converted to digital values by the A/D converting circuit 59, and detects the phase differences in accordance with the level differences in the phase difference signals which were produced at timings immediately after the electromagnetic waves were continuously generated in the auxiliary antenna coil 51 for a predetermined period of time or longer during the information identifying period and at timings immediately after the electromagnetic waves were emitted intermittently at predetermined intervals for a certain duration which is sufficiently shorter than the above predetermined period of time, the level differences having been converted into digital values through the A/D converting circuit 43. The central processing unit 60 also detects the internal loss based on the level differences of the received signals converted into the digital values through the A/D converting circuit 44, and based on the detection results, the central processing unit 60 detects the resonance characteristics of the resonance circuit 21 at the respective timings mentioned above, thus reproducing the pen pressure information and the detailed color information by referring to a table showing the relationship between the resonance characteristics and the respective kinds of information determined beforehand.

According to this position detecting device, the auxiliary antenna coil is employed to generate electromagnetic waves and to receive electromagnetic waves associated with information identification. This eliminates the need for selecting a loop coil in accordance with the position of the position pointing device when an electromagnetic wave is generated during the coordinate detection period or during the information identifying period, thus achieving quicker movement of the position pointing device and reduced load on the central processing unit 60.

The detector 38, the low-pass filter 40, the sample holding circuit 42, and the A/D converting circuit 44 in this embodiment are used only when the characteristic control in the resonance circuit of the position pointing device causes level variations in received signals, which are irrelevant to the phase such as in a case where control involving variations in the internal loss in the resonance circuit is carried out.

FIG. 11 illustrates the second embodiment of the position pointing device in accordance with the present invention. The drawing shows an example wherein the detailed gradation information on red, green, and blue and the pen pressure information are set using a plurality of bits of binary code. In the drawing, numeral 61 denotes a resonance circuit, numeral 62 a resonance characteristic varying circuit, numeral 63 a power circuit, numeral 64 a timing extracting circuit, and numeral 65 a continuous signal detecting circuit. Further, numerals 66-1, 66-2, 66-3, and 66-4 denote continuous amount/time converting means, numeral 67 a counter, numeral 68 a comparing circuit, numerals 69-1, 69-2, 69-3, and 69-4 latches, numeral 70 a delay circuit, and numeral 71 a parallel/serial (P/S) converting circuit.

FIG. 12 illustrates an example of a combination of the resonance circuit 61 and the resonance characteristic varying circuit 62. The resonance circuit 61 is constituted by a coil 611 and a capacitor 612, while the resonance characteristic varying circuit 62 is constituted by a diode 621 and an analog switch 622. The analog switch 622 turns ON/OFF in accordance with the signals received from the P/S converting circuit 71. More specifically, the analog switch 622 turns OFF in response to a low-level signal, while it turns ON in response to a high-level signal. When the analog switch 622 is ON, the electric charges stored in the capacitor 612 are discharged via the diode 621, thereby reducing the signal voltage level to zero. In this embodiment, the signal voltage in the resonance circuit 61 is controlled; however, the resonance frequency may be controlled, i.e., changed as an alternative. The diode 621 functions to protect the analog switch 622 from negative voltage.

The power circuit 63 has a well-known configuration; it has a diode and a capacitor. The power circuit 63 creates an DC line voltage from the induced voltage occurring in the resonance circuit 61 due to an electromagnetic wave radiated from the position detecting device and it supplies the DC line voltage to other circuits.

FIG. 13 shows an example of the timing extracting circuit 64 which includes a detecting circuit constituted by a diode 641, a capacitor 642, and a resistor 643, and a buffer amplifier 644. FIG. 14 illustrates some examples of the signal waveforms observed at various points of the circuit shown in FIG. 13. The drawing shows an example wherein AC signal XI generated in the resonance circuit 61 by electromagnetic wave X intermittently radiated from the position detecting device is applied. AC signal XI is envelope-detected through a diode 641, a capacitor 642, and a resistor 643, then the waveform thereof is shaped by the buffer amplifier 644 to provide pulse signal XII.

FIG. 15 illustrates an example of the continuous signal detecting circuit 65 which is constituted by an integrating circuit incorporating a diode 651, a resistor 652, and a capacitor 653, and a buffer amplifier 654. FIG. 16 illustrates some typical signal waveforms observed at various points of the circuit shown in FIG. 15. The drawing shows an example wherein AC signal XIV is generated in the resonance circuit 61 by electromagnetic wave which is continuously radiated from the position detecting device for a predetermined period of time or longer and after that intermittently radiated for a predetermined duration in a certain cycle which is sufficiently shorter than the predetermined period of time, and the AC signal XIV is supplied to the timing extracting circuit 64 to extract pulse signal XV which is integrated through the diode 651, the resistor 652, and the capacitor 653 to provide signal XVI the waveform of which is shaped by the buffer amplifier 654 to provide signal XVII constituted by only a continuous pulse.

FIG. 17 illustrates an example of one of the continuous amount/time converting means 66-1 through 66-4; it is constituted by a buffer amplifier 663 and a differentiating circuit which includes a capacitor 662 and a variable-resistance element 661 the resistance of which varies in accordance with the pen pressure applied to the tip of the enclosure or the set angles of a means for setting one of the kinds of information among the detailed gradation information on red, green, and blue and the pen pressure such as the dial rings as in the case of the first embodiment.

FIG. 18 illustrates some examples of signal waveforms observed at some points of the circuit shown in FIG. 17. The waveforms are produced when pulse signal XVIII from the continuous signal detecting circuit 65 is applied. Pulse signal XVIII is differentiated through the variable-resistance resistor 661 and the capacitor 662 to produce signal XIX the waveform of which is shaped by the buffer amplifier 663 to provide output signal XX. The attenuation characteristic (time) of signal XIX varies with the resistance of the variable-resistance element 661 (to be more specific, the time required for attenuation increases as the resistance value increases); therefore, the pulse width of output signal XX changes in accordance with the setting of the variable-resistance element 661, i.e., the set detailed color information or pen pressure information. The diode 664 functions to prevent negative voltage from occurring when the pulse signal falls.

From the moment the continuous signal detected by the continuous signal detecting circuit 65 is applied to the moment a stop signal is received from a comparing circuit 68 to be discussed later, the counter 67 counts the number of waves of the induced voltage generated in the resonance circuit 61 due to the electromagnetic wave radiated from the position detecting device. The comparing circuit 68 compares the count value on the counter 67 with a predetermined value which is larger than the count value corresponding to a maximum time among the likely times in the continuous amount/time converting means 66-1 through 66-4 and it outputs a stop signal when the predetermined value is reached.

The latches 69-1 through 69-4 hold the count values on the counter 67 obtained at the time of the fall of the output signals of the continuous amount/time converting circuits 66-1 through 66-4. The delay circuit 70 delays a certain time the timing signal extracted by the timing extracting circuit 64. The P/S converting circuit 71 sends in sequence the count values held by the latches 69-1 through 69-4 to the resonance circuit 61 in synchronization with the timings, at which the electromagnetic waves are intermittently radiated from the position detecting device at certain intervals, among the timings extracted by the timing extracting circuit 64, thus changing the resonance characteristics of the resonance circuit 61.

FIG. 19 illustrate the examples of the signal waveforms observed at various portions of the device shown in FIG. 11. The following describes the operations involved in the device. It is assumed that the configuration of the position detecting device is identical to that disclosed in Japanese Patent Laid-Open No. 2-162410.

If electromagnetic waves of a certain frequency are being radiated from the position detecting device at the timings illustrated by waveform XXI, then signal XXII based on waveform XXI is produced in the resonance circuit 61. Regarding signal XXII, the voltage neither rises suddenly even when the electromagnetic waves are received nor falls suddenly when the electromagnetic waves are no longer received because of the transient phenomenon of the resonance circuit.

Signal XXII is sent as a clock to the counter 67 when the DC power to be sent to the power circuit 63 to drive the component units is extracted and it is also sent to the timing extracting circuit 64 to provide signal XXIII which follows the radiating timings of the electromagnetic waves from the position detecting device. Signal XXIII is sent to the delay circuit 70 where it is delayed by the certain time to provide signal XXIV and also sent to the continuous signal detecting circuit 65 to provide signal XXV which stays at high level only while signal XXIII lasts for a predetermined period of time or longer. Signal XXIII is delayed to generate signal XXIV in order to make the control timing for the resonance characteristic varying circuit 62 to be discussed later coincide with the timing at which the radiation of the electromagnetic waves from the position detecting device is stopped, i.e., the electromagnetic wave receiving timing.

Signal XXV is applied to the counter 67 to cause the counter 67 to initiate counting and it is also applied to the continuous amount/time converting circuits 66-1 through 66-4. The counter 67 counts the number of signals XXII and concurrently outputs count value XXVI expressed by a digital signal of a plurality of bits (signal XXVI shown in FIG. 19 is the signal for the lowest digit on the counter) to the comparing circuit 68 and the latches 69-1 through 69-4.

The continuous amount/time converting circuits 66-1 through 66-4 generate signals of time width corresponding to the detailed gradation information on red, green, and blue, and pen pressure information in accordance with signal XXV and apply them to corresponding latches 69-1 through 69-4. For instance, the continuous amount/time converting circuit 66-1 generates signal XXVII and applies it to the corresponding latch 69-1. The latches 69-1 through 69-4 temporarily hold the count values on the counter 67 at the time of fall of the signals received from the continuous amount/timing converting means 66-1 through 66-4. The operation of the counter 67 is stopped when the count value thereof reaches the aforesaid predetermined value and the stop signal is received from the comparing circuit 68.

The P/S converting circuit 71 sends out in sequence to the resonance characteristic varying circuit 62 the digital signals, each having four types of bits, namely, eight bits in this example, which are held in the latches 69-1 through 69-4, in synchronization with the rises of the intermittent pulse signals in signal XXIV. The resonance characteristic varying circuit 62 does not do anything when the digital signal is "0", while it short-circuits the resonance circuit 61 so as to emit no signal when the digital signal is "1".

Signals XXII, XXIII, and XXIV show an example wherein all the detailed gradation information on red, green, and blue and the pen pressure information are zero and all the four kinds of count values held in the latches 69-1 through 69-4 are "0", i.e., all the four 8-bit digital signals are "0".

If, for instance, predetermined detailed gradation information on red, green, and blue is applied and the latches 69-1 through 69-3 hold 8-bit digital signals "10011000," "11000011," and "11010101" as the count values, then the P/S converting circuit 71 issues signal XXVIII of "1", "0", "0", "1", "1", "0", "0", "0", "1", "1", "0", "0", "0", "0", "1", "1", "1", "1", "0", "1", "0", "1", "0", "1" to the resonance characteristic varying circuit 62 in synchronization with the rises of the pulse signals in signal XXIV.

Since the resonance characteristic varying circuit 62 short-circuits the resonance circuit 61 so as to generate no signal at the timing when the digital signal of 1 is received, signal XXII turns into signal XXII'. Likewise, signal XXIII and signal XXIV turn into signal XXIII' and XXIV'.

As it is obvious from signal XXI and XXII' shown in FIG. 19, there is a signal in the resonance circuit 61 at the timing when the position detecting device receives an electromagnetic wave when the digital signal of 0 is applied to the resonance characteristic varying circuit 62. There is no signal, however, in the resonance circuit 61 at the timing when the position detecting device receives the electromagnetic wave when the digital signal of 1 is applied to the resonance characteristic varying circuit 62, preventing the position detecting device from receiving the electromagnetic wave. Hence, the position detecting device is allowed to obtain the four kinds of count values held in the latches 69-1 through 69-4, namely, the detailed gradation information on red, green, and blue, and the pen pressure information by the presence of the electromagnetic wave received at a predetermined timing.

Thus, according to the embodiment, the setting concerning the detailed gradation information on red, green, and blue, and the pen pressure is converted into a plurality of bits of binary code before it is transmitted. This enables accurate input of the detailed gradation information on red, green, and blue, and the pen pressure information regardless of ambient noises, variations in circuit elements or the like.

Depending on set values of the elements in the continuous amount/time converting means 66-1 through 66-4, even if the information is 0, the output signal may have a certain time width or more and the four kinds of the count values held in the latches 66-1 through 66-4 may not become 0. In this case, of the digital signals of a plurality of bits expressing the count values, a digital signal of not less than a digit which does not make the bit 1 may be issued to the P/S converting circuit 71.

In the previous embodiment, the number of electromagnetic waves which are intermittently radiated after an electromagnetic wave is emitted continuously for a predetermined period of time or more from the position detecting device is set to 32 (8 bits×4); however, the number may be different from that as long as it is a number of bits required for expressing the number of kinds of information to be transmitted and for expressing the respective kinds of information. When transmitting such information together with an additional kind of information, more bits will be added accordingly.

FIG. 20 shows the third embodiment of the position pointing device in accordance with the present invention. In this embodiment, a command from the position detecting device is received and information is transmitted to the position detecting device at the same time. More specifically, a 4-bit command which employs code 1 for expressing the electromagnetic wave lasting for the predetermined period of time or more but less than the maximum period of time and code 0 for expressing the electromagnetic wave lasting for the certain duration which is sufficiently shorter than the predetermined period of time is sent from the position detecting device to the position pointing device, the 4-bit command being preceded by an electromagnetic wave lasting for the maximum period of time or more as the initiation bit. Further, the information selected by the command during the previous information identifying period in synchronization with the 4-bit command timing is transmitted from the position pointing device to the position detecting device by controlling the resonance frequency of the resonance circuit as mentioned above.

In FIG. 20, numeral 81a denotes a coil, numerals 81b, 82a, and 82b capacitors, numerals 82c and 82d switches, numeral 83 a power circuit, numerals 84a, 84b, and 84c diodes, and numerals 84d, 84e, and 84f low-pass filters (LPFs). Further, numerals 84g, 84h, and 84i denote comparators, numeral 85a a D flip-flop, numeral 85b a counter, numeral 85c a shift register, numeral 85d a 4-bit latch, numeral 85e a selector, and numeral 85f a multiplexer.

The coil 81a and the capacitor 81b are connected in series to constitute a well-known resonance circuit 81. The capacitors 82a and 82b are connected in parallel to the capacitor 81b of the resonance circuit 81 via the switches 82c and 82d to constitute a resonance characteristic varying circuit 82 which changes the resonance frequency of the resonance circuit 81 in accordance with four combinations of the ON/OFF of the switches 82c and 82d, thereby controlling the resonance characteristic of the resonance circuit 81 to one of the four different resonance characteristics.

The power circuit 83 takes out DC voltage from the induced voltage generated in the resonance circuit 81 and supplies it as a line voltage to other circuit.

The diode 84a, the low-pass filter 84d, and the comparator 84g take out only the induced voltage lasting for the maximum period of time or more from the induced voltage, which is generated in the resonance circuit 81, by using the low-pass filter 84d having a relatively large time constant (t), then they shape the waveforms thereof to produce a switching signal. Likewise, the detecting circuit 84b, the low-pass filter 84e, and the comparator 84h take out only the induced voltage, which lasts for the predetermined period of time or longer, from the induced voltage occurring in the resonance circuit 81, by using the low-pass filter 84e having a medium time constant (t) and they shape the waveform thereof to produce an initiation timing signal. Further, the detecting circuit 84c, the low-pass filter 84f, and the comparator 84i take out the induced voltage, which is intermittently generated for a certain duration, which is well shorter than the predetermined period of time, at predetermined intervals, from the induced voltage occurring in the resonance circuit 81 by means of the low-pass filter 84f having a relatively small time constant (t), then they shape the waveform thereof to produce a clock. These components constitute the command extracting means mentioned in claim 9.

The D flip-flop 85a holds the switching signal until the count value on the counter 85b reaches a predetermined value ("4" in this example) and outputs the value to the multiplexer 85f. The counter 85b is activated by the actuation timing signal and it counts the number of clocks and issues the count value to the multiplexer 85f. When the D flip-flop 85a has been set by the output from the comparator 84g and started by a Q output thereof along with the counter 85b, the shift register 85c reads the output signal of the comparator 84h, i.e., the command, in accordance with the clock received from the comparator 84i. The 4-bit latch 85d latches the output of the shift register 85c when the count value on the counter 85b reaches a predetermined value ("4" in this case). The selector 85e selects one set of information from 16 sets of information (a total of 128 bits of information, each set including eight bits) which contains the detailed information on a plurality of factors defining a color in accordance with the 4-bit command held in the latch 85d. The multiplexer 85f sends the information constituted by eight bits of binary code, which has been selected by the selector 85e, to the switches 82c and 82d, two bits at a time in synchronization with each bit of the command during the following information identifying period, and changes the resonance frequency of the resonance circuit 81 in order to transmit the information to the position detecting device. All these components constitute an initiation control means 85.

FIG. 21 shows an example of the color information setting circuit which outputs a set of information for the selector 85e. In the circuit, eight switches 86a through 86h are connected in parallel between the power source and the ground via resistors, respectively, so that information constituted by eight bits of binary code based on the setting of the ON/OFF of the respective switches is generated.

FIG. 22 shows another example of the color information setting circuit which outputs a set of information for the selector 85e. This color information setting circuit has a variable resistor 87, which is connected in parallel between the power source and the ground and the resistance of which varies in accordance with the set rotational angle of a dial ring (not shown), and an analog-to-digital (A/D) converting circuit 88 which converts an output voltage of the variable resistor 87 into eight bits of binary code.

FIG. 23 shows the same signal waveforms as those of FIG. 19, which are produced when the position pointing device of the present embodiment is employed. In the Figure, XXIX shows the signal transmitted from the position detecting device, XXX the signal received by (induced voltage in) the resonance circuit 81, XXXI the output signal of the low-pass filter 84f, XXXII the output signal of the comparator 84i, XXXIII the output signal of the low-pass filter 84e, XXXIV the output signal of the comparator 84h, XXXV the output signal of the low-pass filter 84d, XXXVI the output signal of the comparator 84g, XXXVII the Q output of the D flip-flop 85a, and XXXVIII the count value of the counter 85b. The waveforms obtained during the coordinate detection period are omitted.

According to the position pointing device of this embodiment, the information based on 128 bits of binary code can be entered, enabling a large volume of detailed color information and other kinds of information to be entered.

As the detailed information relating to the plurality of factors defining a color, the gradation information on four basic colors, cyan, yellow, magenta, and black used for printing and the like in addition to the gradation information on red, green, and blue may be used. Further, detailed information concerning hue, brightness, and chroma may also be used. Furthermore, in addition to the color information, a factor for setting the amount of a remaining background color (transparency) on a screen, the thickness of the pen to draw with, the density of dots (roughness), a dot pattern to be left uncolored (mask pattern), etc. may be set.

Thus, according to the aspect of the present invention described in claim 1, a position pointing device featuring very good man-machine interface can be achieved by providing the position pointing device with an electromagnetic wave generating means for generating an electromagnetic wave which has certain space distribution corresponding to the coordinate value of a pointed position and the intensity or frequency of which varies in accordance with external control, a color information setting means for setting detailed information concerning a plurality of factors defining a color, a control means for controlling the electromagnetic wave generating means in accordance with the set contents, and a power supplying means for supplying power to component units. Thus, simply setting detailed information related to a plurality of factors defining a color, e.g., detailed gradation information on the basic colors such as red, green, and blue, in the color information setting means causes the electromagnetic wave generating means to generate an electromagnetic wave the intensity or frequency of which is controlled in accordance with the information, thus allowing the detailed color information to be supplied to the position detecting device.

Further, according to another aspect of the present invention described in claim 2, a control means for controlling the electromagnetic wave generating means in time series in accordance with set contents is provided; therefore, merely setting the detailed color information such as the detailed gradation information on the basic colors including red, green, and blue in the color information setting means causes the electromagnetic wave generating means to produce in a time series electromagnetic waves the intensity or frequency of which are controlled in accordance with the information, thus enabling many set contents, i.e., much detailed color information to be entered.

Moreover, according to still another aspect of the present invention described in claim 3, there are provided a color information setting means for setting a plurality of bits of binary code expressing detailed information concerning a plurality of factors defining a color and a control means for controlling the electromagnetic wave generating means in time series in accordance with the plurality of bits of binary code; therefore, simply setting the detailed color information such as the detailed gradation information on the basic colors including red, green, and blue in the color information setting means causes the electromagnetic wave generating means to produce in a time series electromagnetic waves the intensity or frequency of which are controlled in accordance with the plurality of bits of binary code expressing the information, thus enabling the detailed color information to be entered accurately regardless of ambient noises, the variations in circuit elements, etc.

According to yet another aspect of the present invention described in claim 4, there is provided an electromagnetic wave generating means constituted by an oscillating circuit for generating an AC signal of a predetermined frequency, a modulating circuit for modulating the AC signal of the predetermined frequency in accordance with external control, an amplifier for amplifying the modulated signal, and an antenna connected to the output of the amplifier; therefore, simply setting the detailed color information such as the detailed gradation information on the basic colors including red, green, and blue in the color information setting means causes an electromagnetic wave, which has been modulated in accordance with the information to be generated, thus enabling accurate and quick input of the detailed color information to be entered accurately regardless of ambient noises and the like.

According to another aspect of the present invention described in claim 5, there is provided an electromagnetic wave generating means constituted by a resonance circuit having a predetermined resonance characteristic and a resonance characteristic varying circuit which changes the predetermined resonance characteristic in accordance with external control; therefore, simply setting the detailed color information such as the detailed gradation information on the basic colors including red, green, and blue in the color information setting means allows the characteristic, namely, the intensity or frequency, of an electromagnetic wave transmitted from the position detecting device to be changed in accordance with the aforesaid information before it is reflected, thus enabling the detailed color information to be supplied to the position detecting device with minimized power consumption.

According to another aspect of the present invention described in claim 6, a power supply means constituted by a battery is provided, eliminating the need of a cable and also achieving a position pointing device featuring excellent man-machine interface.

According to still another aspect of the present invention described in claim 7, there is provided a power supplying means designed to take out electrical energy for driving component units from the electromagnetic wave received by the resonance circuit, thus eliminating the need of a cable or a battery and also achieving a position pointing device featuring excellent man-machine interface.

According to yet another aspect of the present invention described in claim 8, there is provided a pressure converting means for detecting the pen pressure, so that the detection result is supplied to the control means along with the contents set by the color information setting means to control the electromagnetic wave generating means, thus enabling the pen pressure information to be supplied along with the detailed color information to the position detecting device.

According to another aspect of the present invention described in claim 9, there are provided an electromagnetic wave receiving means for receiving an electromagnetic wave which contains a command issued from the position detecting device, a command extracting means for extracting the command from the received electromagnetic wave, and an initiation control means for activating a control means in accordance with the command; therefore, only when the electromagnetic wave containing the command is transmitted from the position detecting device, i.e., only when the position detecting device requests, an electromagnetic wave the intensity or frequency of which has been controlled in accordance with the aforesaid information is emitted from the electromagnetic wave generating means, thus enabling the detailed color information to be entered with minimized sacrifice in the sampling rate for coordinate detection.

According to still another aspect of the present invention described in claim 10, there are provided an electromagnetic wave receiving means for receiving an electromagnetic wave which contains predetermined timing information issued from the position detecting device, a timing extracting means for extracting the predetermined timing information from the received electromagnetic wave, and an initiation control means for activating the control means at a plurality of particular timings based on the predetermined timing information; therefore, the intensity or frequency of the electromagnetic wave generated by the electromagnetic wave generating means in synchronization with the timing of the position detecting device can be controlled in accordance with the detailed color information, thus enabling secure input of the information.

According to yet another aspect of the present invention described in claim 11, a resonance circuit constituting the electromagnetic wave generating means is employed as the electromagnetic wave receiving means. This eliminates the need of antennas for the electromagnetic wave generating means and the electromagnetic wave receiving means, thus enabling a further compact device.

What is claimed is:

1. A position pointing device for deriving a coordinate value of a pointed position and information concerning a color by exchanging an AC field with a position detecting device, said position pointing device comprising:

means for generating an AC field having a spatial distribution corresponding to the coordinate value of the pointed position relative to the position detecting device and an amplitude or frequency responsive to an external control;

color information setting means for setting detailed information related to plural factors defining a particular color;

control means for controlling said AC field generating means in accordance with said detailed information; and power supplying means for supplying power to component units of the position pointing device.

2. A position pointing device for deriving a coordinate value of a pointed position and information concerning a color by exchanging an AC field with a position detecting device, said position pointing device comprising:

means for generating an AC field having a spatial distribution corresponding to the coordinate value of the pointed position relative to the position detecting device and an amplitude or frequency responsive to an external control;

color information setting means for setting detailed information related to plural factors defining a particular color;

control means for controlling said AC field generating means in time series in accordance with said detailed information; and power supplying means for supplying power to component units of the position pointing device.

3. A position pointing device for deriving a coordinate value of a pointed position and information concerning a color by exchanging an AC field with a position detecting device, said position pointing device comprising:

means for generating an AC field having a spatial distribution corresponding to the coordinate value of the pointed position relative to the position detecting device and an amplitude or frequency responsive to an external control;

color information setting means for setting a plurality of bits of binary code expressing detailed information related to a plurality of factors defining a particular color;

control means for controlling said AC field generating means in time series in accordance with said plurality of bits of binary code; and power supplying means for supplying power to component units of the position pointing device.

4. A position pointing device according to claim 1 wherein said AC field generating means comprises:

an oscillating circuit for generating an AC wave of a predetermined frequency;

a modulating circuit for modulating said AC wave of the predetermined frequency in accordance with the external control;

an amplifier for amplifying said modulated AC wave; and an AC field emitter responsive to an output of said amplifier.

5. A position pointing device according to claim 1 wherein said AC field generating means comprises:

a resonance circuit having a predetermined resonance characteristic; and a resonance characteristic varying circuit for varying said predetermined resonance characteristic in accordance with the external control.

6. A position pointing device according to claim 1 wherein the power supplying means includes a battery.

7. A position pointing device according to claim 5 wherein the power supplying means includes means for extracting electrical energy from an AC field received by the resonance circuit, the extracting means driving the component units.

8. A position pointing device according to claim 1 further including pressure converting means for detecting pressure exerted by a tip of the device on a surface, the AC field being controlled in response to the pressure detected by the pressure converting means.

9. A position pointing device according to claim 1 comprising:

AC field receiving means for receiving an AC field containing a command from the position detecting device;

command extracting means for extracting the command from the received AC field; and initiation means for activating the control means in accordance with said command.

10. A position pointing device according to claim 1 comprising:

AC field receiving means for receiving an AC field containing predetermined timing information from the position detecting device;

timing extracting means for extracting said predetermined timing information from said received AC field; and initiation means for activating the control means at plural times based on said predetermined timing information.

11. A position pointing device according to claim 9 wherein the AC field receiving means includes a resonance circuit, the resonance circuit being included in the AC field generating means.

12. A method of supplying a position detecting device with a coordinate value of a pointed position of a position pointing device and information concerning a selected color associated with the position pointing device on the position detecting device comprising:

generating on the position pointing device an AC field having a spatial distribution corresponding to the coordinate value of the pointed position relative to the position detecting device derived on the position pointing device;

setting controllers on the position pointing device with detailed information related to plural factors defining a particular color; and controlling the amplitude or frequency of said AC field in accordance with the plural factors defining the particular color.

13. The method of claim 12 wherein the amplitude or frequency of the AC field is controlled at different times in accordance with each of each of the plural factors.

14. The method of claim 12 wherein the color information is set with plural bits of binary code expressing detailed information related to the plural factors defining the particular color.

15. The method of claim 12 further comprising receiving the AC field at the position detecting device, and in response to the received AC field deriving signals indicative of the position of the position pointing device relative to the position detecting device and the detailed information related to the plural factors defining the particular color.

16. The method of claim 15 further including responding to the derived signals indicative of the position of the position pointing device relative to the position detecting device and the detailed information related to the plural factors defining the particular color to display the particular color and the position of the pointing device relative to the position detecting device.

17. The method of claim 16 further comprising emitting another AC field from the position detecting device, the position pointing device responding to the another AC field to derive the AC field having the spatial distribution corresponding to the coordinate value of the pointed position.

18. The method of claim 15 further comprising emitting another AC field from the position detecting device, the position pointing device responding to the another AC field to derive the AC field having the spatial distribution corresponding to the coordinate value of the pointed position.

19. The method of claim 15 further comprising pressing the position pointing device on a surface, detecting on the position pointing device the pressure exerted by the position pointing device on the surface, and controlling the AC field so a characteristic thereof is a function of the detected pressure, and responding at the position detecting device to the AC field characteristic that is a function of the detected pressure to derive a signal indicative of the detected pressure.

20. The method of claim 19 further including responding to the derived signals indicative of the position of the position pointing device relative to the position detecting device and the detailed information related to the plural factors defining the particular color and the detected pressure to display the position of the pointing device relative to the position detecting device and the particular color and the detected pressure.

21. The method of claim 12 further comprising pressing the position pointing device on a surface, detecting on the position pointing device the pressure exerted by the position pointing device on the surface, and controlling the AC field so a characteristic thereof is a function of the detected pressure.

22. In combination, a position pointing device for deriving a coordinate value of a pointed position and information concerning a color, and a position detecting device, said position pointing device comprising:
(a) means for generating an AC field having a spatial distribution corresponding to the coordinate value of the pointed position relative to the position detecting device;
(b) color information setting means for setting detailed information related to plural factors defining a particular color;
(c) control means for controlling the amplitude or frequency of said AC field generating means in accordance with said detailed information; and
(d) power supplying means for supplying power to component units of the position pointing device, the position detecting device including:

means responsive to the AC field for deriving signals indicative of (i) the position of the position pointing device relative to the position detecting device and (ii) the plural factors defining the particular color.

23. The combination of claim 22 further including a display responsive to the signals indicative of (i) and (ii) for displaying the position of the position pointing device relative to the position detecting device and the particular color.

24. The combination of claim 23 wherein the position detecting means includes an emitter for another AC field, the position pointing device including means responsive to the another AC field for deriving the AC field having the controlled amplitude or frequency and the spatial distribution corresponding to the coordinate value of the pointed position.

25. A position pointing device for deriving a coordinate value of a pointed position and information concerning a parameter by exchanging an AC field with a position detecting device, said position pointing device comprising:

means for generating an AC field having a spatial distribution corresponding to the coordinate value of the pointed position relative to the position detecting device;

parameter information setting means for setting detailed information related to plural factors defining a particular parameter;

control means for controlling the amplitude or frequency of said AC field derived by the means for generating in accordance with the plural factors defining the particular parameter; and power supplying means for supplying power to component units of the position pointing device.

26. The position pointing device of claim 25 further including means on the position pointing device for controlling the amplitude or frequency of the AC field at different times in accordance with each of the plural factors.

27. The position pointing device of claim 25 further including a variable impedance on the position pointing device for selectively controlling the amplitude of frequency of the AC field in response to manual control settings on the position pointing device representing the plural factors.

28. The position pointing device of claim 25 further including plural variable impedances on the position pointing device, each impedance having plural discrete settings for selectively controlling the amplitude or frequency of the AC field in response to manual control settings on the position pointing device representing the plural factors, and means for sequentially connecting different ones of the variable impedances in circuit for control of the AC field amplitude or frequency.

29. The position pointing device of claim 28 wherein the means for sequentially connecting is activated in response to the position pointing device receiving another AC field.

30. The position pointing device of claim 29 wherein the another AC field has about the same frequency as the AC field generated by the position pointing device, the AC field generated and received by the position pointing device being transduced by a resonant circuit to which the variable impedances are selectively connected.

* * * * *